United States Patent [19]
Stump et al.

[11] Patent Number: 6,161,630
[45] Date of Patent: Dec. 19, 2000

[54] APPARATUS AND METHOD FOR CONTROLLING AN UNDERGROUND BORING TOOL

[75] Inventors: Gregory S Stump, Oakland, Ill.; Christopher T. Allen, Independence, Mo.

[73] Assignee: Vermeer Manufacturing Company, Pella, Iowa

[21] Appl. No.: 09/311,085

[22] Filed: May 13, 1999

Related U.S. Application Data

[63] Continuation of application No. 08/784,061, Jan. 17, 1997, Pat. No. 5,904,210, which is a continuation-in-part of application No. 08/587,832, Jan. 11, 1996, Pat. No. 5,720,354.

[51] Int. Cl.$^7$ .......................... E21B 44/00; E21B 47/00; G01V 3/08; G01V 3/00

[52] U.S. Cl. ............................ 175/26; 175/24; 175/40; 175/45; 324/333; 324/338; 340/853.1; 340/853.3; 340/853.4; 340/853.6

[58] Field of Search .............................. 175/24, 26, 40, 175/45, 50; 324/333, 338, 346, 351, 369; 340/853.1, 853.3, 853.4, 853.5, 853.6; 342/22

[56] References Cited

U.S. PATENT DOCUMENTS

| | | |
|---|---|---|
| 3,718,930 | 2/1973 | McCullough et al. . |
| 3,781,879 | 12/1973 | Staras et al. . |
| 3,831,173 | 8/1974 | Lerner . |
| 3,975,735 | 8/1976 | McCullough et al. . |
| 3,979,724 | 9/1976 | Silverman et al. . |
| 4,003,017 | 1/1977 | Bailey .......................... 340/15.5 BH |
| 4,016,942 | 4/1977 | Wallis, Jr. et al. . |
| 4,297,699 | 10/1981 | Fowler et al. . |
| 4,646,277 | 2/1987 | Bridges et al. . |
| 4,698,634 | 10/1987 | Alongi et al. . |
| 4,710,708 | 12/1987 | Rorden et al. . |
| 4,728,897 | 3/1988 | Gunton . |
| 4,787,463 | 11/1988 | Geller et al. . |
| 4,806,869 | 2/1989 | Chau et al. . |
| 4,814,768 | 3/1989 | Chang . |

(List continued on next page.)

FOREIGN PATENT DOCUMENTS

90/15343  12/1990  WIPO .

OTHER PUBLICATIONS

Chemrad Tennessee Corporation, USRADS Series 2100, Brochure.

Fenning, et al., Geophysical Methods for the Location of Underground Storage Tanks, Article.

Geophysical Survey Systems Inc., Model 3200MLF, Multiple, Low–Frequency, Bistatic Antenna, Brochure.

Geophysical Survey Systems Inc., Radan™—Radar Data Analyzer, Product Information Sheet, Jan. 1993.

Geophysical Survey Systems Inc., Sir® System Antennas, Brochure.

Geophysical Survey Systems Inc., SIR® System–2 Subsurface Interface Radar, Brochure.

(List continued on next page.)

Primary Examiner—Eileen D. Lillis
Assistant Examiner—Gary S. Hartmann
Attorney, Agent, or Firm—Altera Law Group LLC

[57] ABSTRACT

An apparatus and method for determining a location and an orientation of an underground boring tool by employment of a radar-like probe and detection technique. The boring tool is provided with a device which generates a specific signature signal in response to a probe signal transmitted from above the ground. Cooperation between the probe signal transmitter at ground level and the signature signal generating device provided at the underground boring tool results in accurate detection of the boring tool location and, if desired, orientation, despite the presence of a large background signal. Precision detection of the boring tool location and orientation enables the operator to accurately locate the boring tool during operation and, if provided with a directional capacity, avoid buried obstacles such as utilities and other hazards. The signature signal produced by the boring tool may be generated either passively or actively, and may be a microwave or an acoustic signal. Further, the signature signal may be produced in a manner which differs from that used to produce the probe signal in one or more ways, including timing, frequency content, information content, or polarization.

38 Claims, 25 Drawing Sheets

U.S. PATENT DOCUMENTS

| | | |
|---|---|---|
| 4,843,597 | 6/1989 | Gjessing et al. . |
| 4,875,014 | 10/1989 | Roberts et al. . |
| 4,881,083 | 11/1989 | Chau et al. . |
| 4,905,008 | 2/1990 | Kawano et al. . |
| 4,907,658 | 3/1990 | Stangl et al. . |
| 4,912,643 | 3/1990 | Beirxe . |
| 4,953,638 | 9/1990 | Dunn . |
| 5,012,248 | 4/1991 | Munro et al. . |
| 5,065,098 | 11/1991 | Salsman et al. . |
| 5,070,462 | 12/1991 | Chau . |
| 5,092,657 | 3/1992 | Bryan, Jr. . |
| 5,155,442 | 10/1992 | Mercer . |
| 5,182,516 | 1/1993 | Ward et al. ............................ 324/326 |
| 5,220,963 | 6/1993 | Patton ..................................... 175/24 |
| 5,264,795 | 11/1993 | Rider . |
| 5,325,095 | 6/1994 | Vadnais et al. . |
| 5,337,002 | 8/1994 | Mercer . |
| 5,339,080 | 8/1994 | Steinway et al. . |
| 5,355,965 | 10/1994 | Rozendaal . |
| 5,384,715 | 1/1995 | Lytton . |
| 5,467,832 | 11/1995 | Orban et al. ............................ 175/45 |
| 5,469,155 | 11/1995 | Archambeault et al. . |
| 5,499,029 | 3/1996 | Bashforth et al. . |
| 5,560,437 | 10/1996 | Dickel et al. ............................ 175/40 |
| 5,585,726 | 12/1996 | Chau . |
| 5,602,541 | 2/1997 | Comeau et al. ..................... 340/853.3 |
| 5,603,386 | 2/1997 | Webster .................................. 175/76 |
| 5,608,162 | 3/1997 | Ho ...................................... 73/152.48 |
| 5,646,611 | 7/1997 | Dailey et al. ....................... 340/853.6 |
| 5,657,826 | 8/1997 | Knuckes .................................. 175/45 |

OTHER PUBLICATIONS

Geophysical Survey Systems Inc., SIR® System–10A Subsurface Interface Radar, Brochure.

Geophysical Survey Systems Inc., Subsurface Detection Problems, Brochure.

Geophysical Survey Systems Inc., Subsurface Solutions, Winter 1995.

GeoRadar, Inc., Model 1000B, Stepped–FM Ground Penetrating Radar, Brochure.

Guenther, M. and Kathage, A. F., Proceedings of the Fifth International Conference on Ground Penetrating Radar, The Geophysical Investigation of Drilling Obstacles for Microtunneling Projects by Means of GPR, vol. 3 of 3, Jun. 1994, pp. 1151–1165.

Kathage, A.F., Proceedings of the Fourth International Conference on Ground Penetrating Radar, Geological Survey of Finland, A Challenge: GPR In Advance of Horizontal Drilling, Special Paper 16, Jun. 1992, pp. 119–124.

Pollution Engineering, Peering Beneath the Surface, Article, Oct., 1992.

Sensors & Software, Inc., Pulse Ekko™, Environment, Feb. 1994.

Sensors & Software, Inc., Pulse Ekko™ 100 Case Studies, pp.80–83, 87–94, 98, 100, 129, 131.

Sensors & Software, Inc., Pulse Ekko™ 100, Features, Brochure.

Sensors & Software, Inc., Pulse Ekko™ 100, Ground Penetrating Radar Technology, Brochure.

Sensors & Software, Inc., Pulse Ekko™ 1000, Brochure.

Weil et al., Investigations of Hazardous Waste Sites Using Thermal IR and Ground Penetrating Radar, Photogrammetric Engineering & Remote Sensing, vol. 60, No. 8, Aug. 1994, pp. 999–1005.

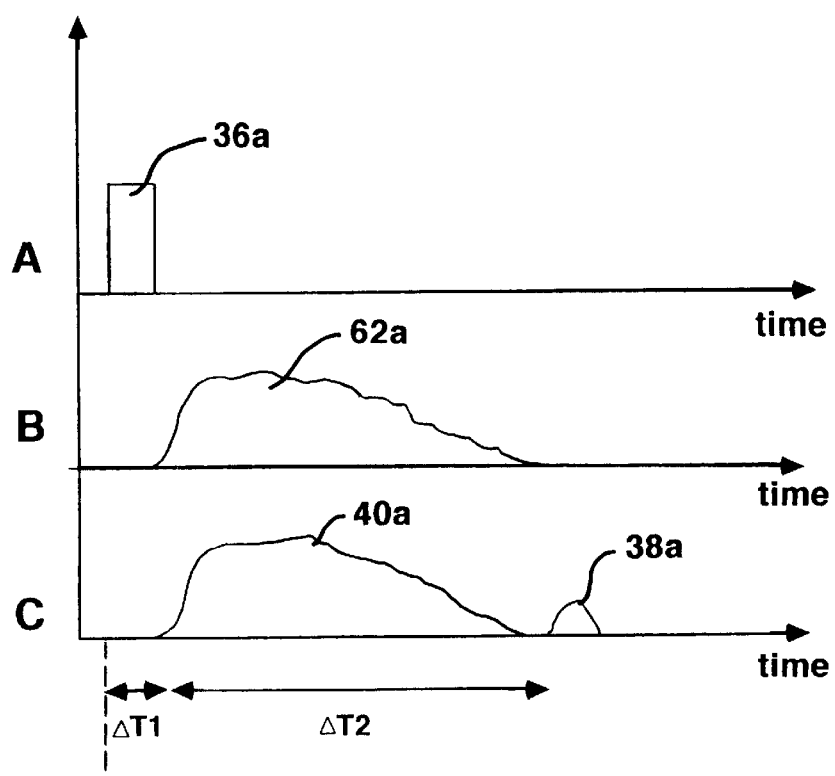
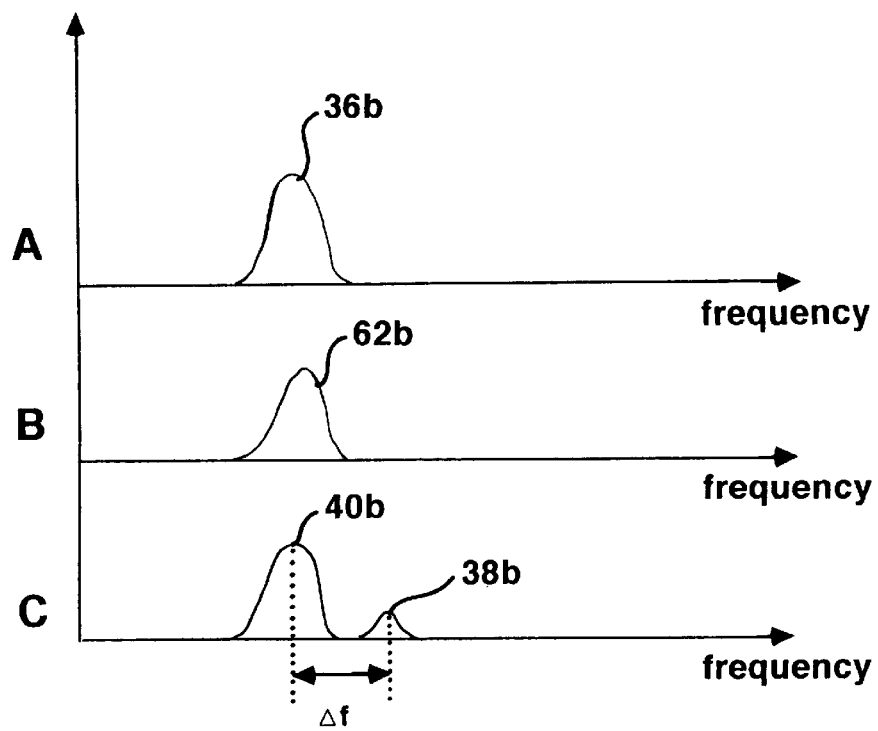

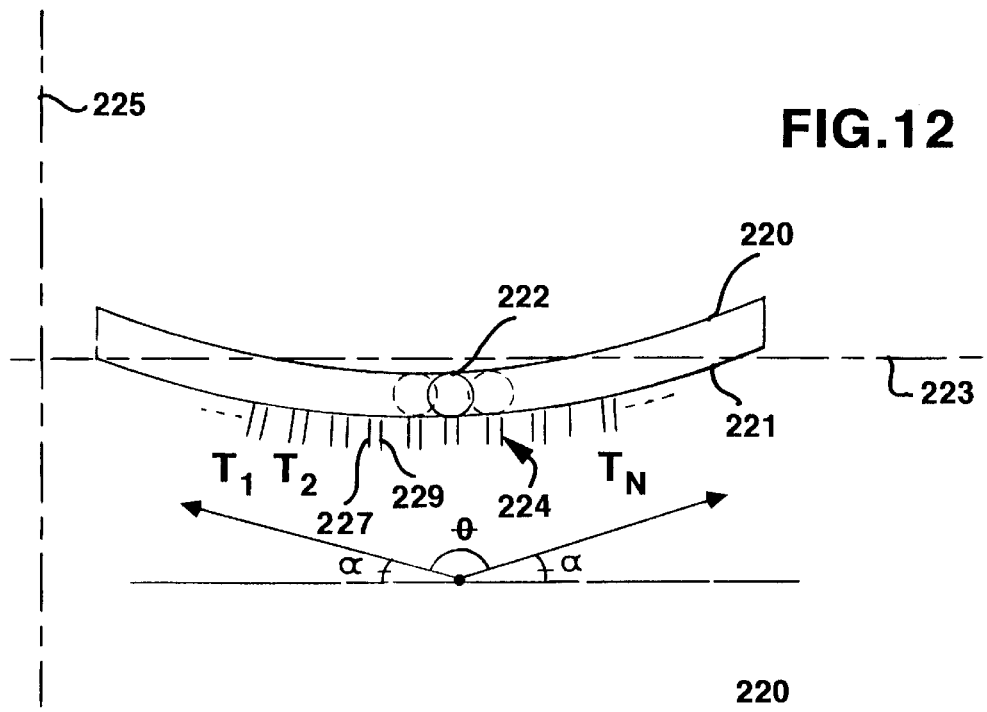
FIG.12
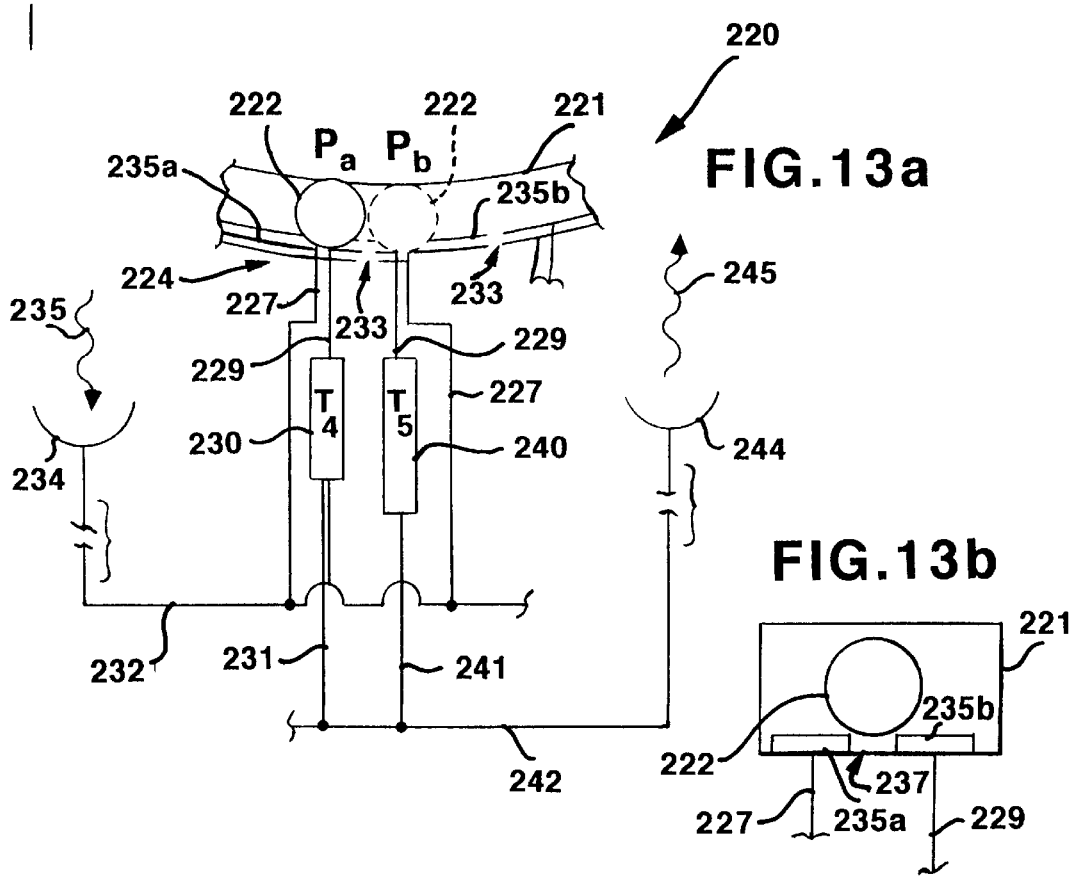
FIG.13a
FIG.13b

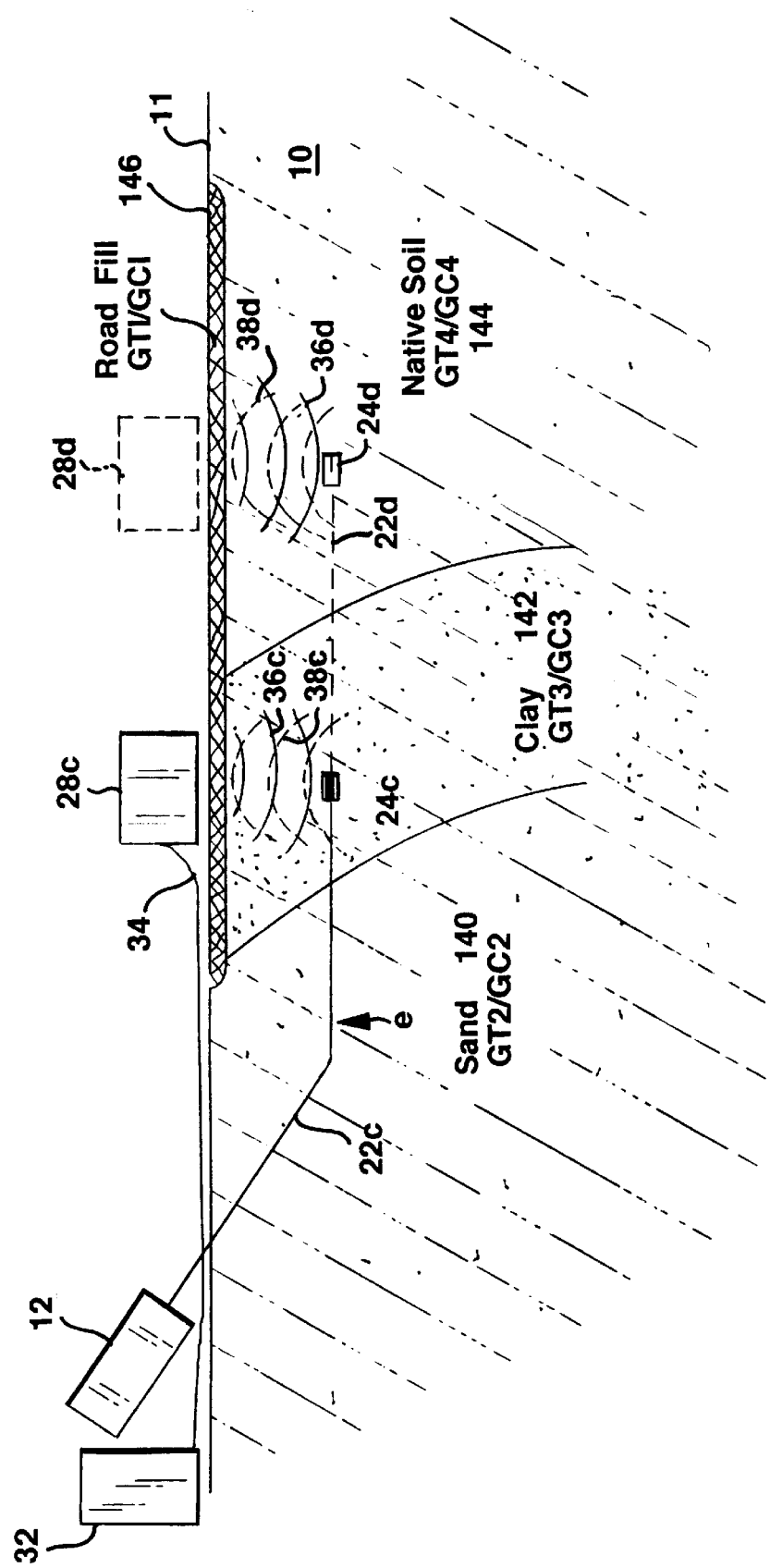

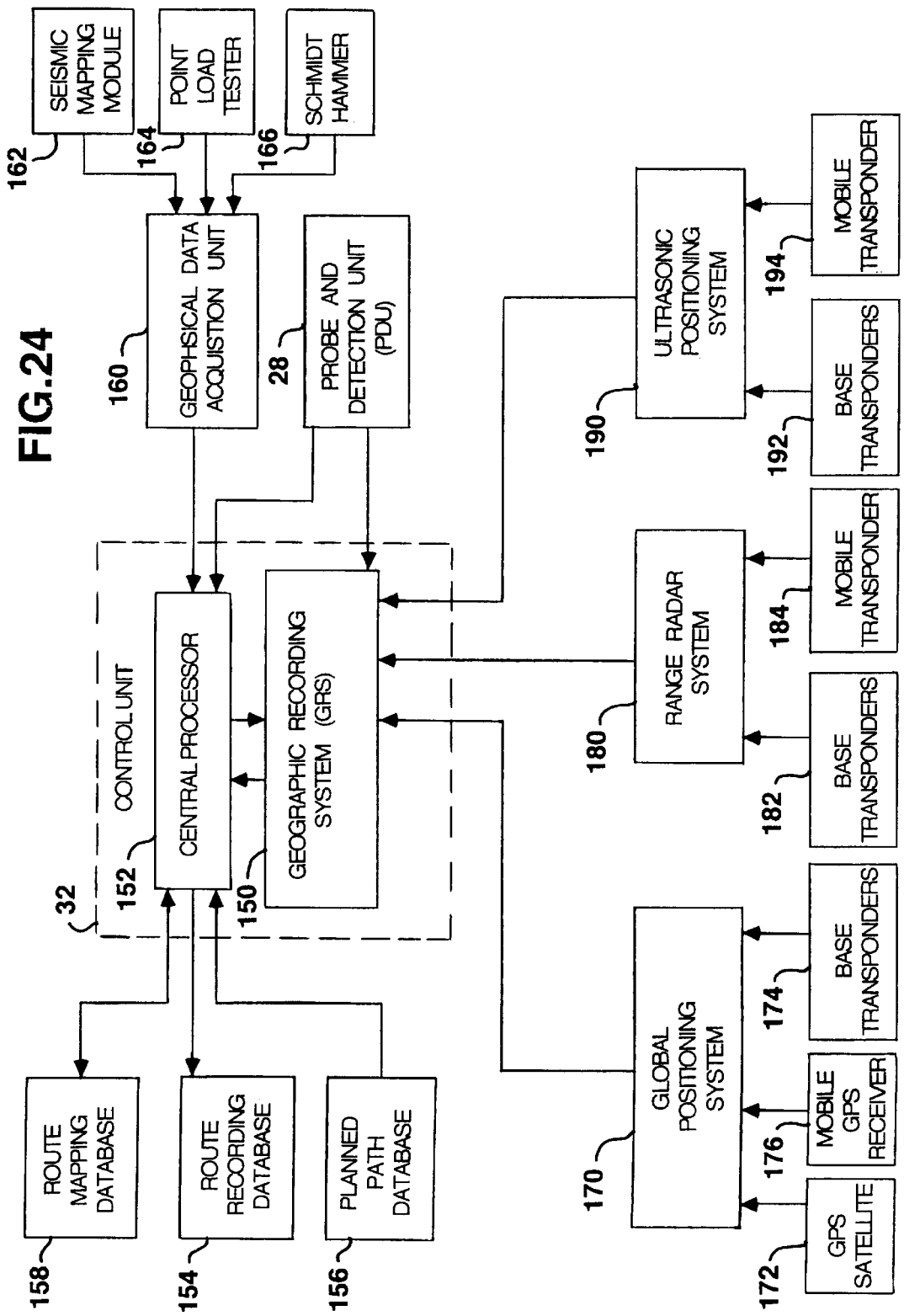

APPARATUS AND METHOD FOR CONTROLLING AN UNDERGROUND BORING TOOL

This is a continuation of application Ser. No. 08/784,061, filed Jan. 17, 1997, now U.S. Pat. No. 5,904,210 which is incorporated herein by reference, which is a Continuation-in-Part of U.S. patent application Ser. No. 08/587,832, filed Jan. 11, 1996, now U.S. Pat. No. 5,720,354.

BACKGROUND OF THE INVENTION

The present invention relates generally to the field of trenchless underground boring and, more particularly, to a system and process for acquiring positional and orientation data on an underground boring tool.

Utility lines for water, electricity, gas, telephone and cable television are often run underground for reasons of safety and aesthetics. In many situations, the underground utilities can be buried in a trench which is then back-filled. Although useful in areas of new construction, the burial of utilities in a trench has certain disadvantages. In areas supporting existing construction, a trench can cause serious disturbance to structures or roadways. Further, there is a high probability that digging a trench may damage previously buried utilities, and that structures or roadways disturbed by digging the trench are rarely restored to their original condition. Also, an open trench poses a danger of injury to workers and passersby.

The general technique of boring a horizontal underground hole has recently been developed in order to overcome the disadvantages described above, as well as others unaddressed when employing conventional trenching techniques. In accordance with such a general horizontal boring technique, also known as microtunnelling or trenchless underground boring, a boring system is situated on the ground surface and drills a hole into the ground at an oblique angle with respect to the ground surface. Water is typically flowed through the drill string, over the boring tool, and back up the borehole in order to remove cuttings and dirt. After the boring tool reaches a desired depth, the tool is then directed along a substantially horizontal path to create a horizontal borehole. After the desired length of borehole has been obtained, the tool is then directed upwards to break through to the surface. A reamer is then attached to the drill string which is pulled back through the borehole, thus reaming out the borehole to a larger diameter. It is common to attach a utility line or other conduit to the reaming tool so that it is dragged through the borehole along with the reamer.

In order to provide for the location of a boring tool, while underground, a conventional approach involves the incorporation of an active beacon, typically in the form of a radio transmitter, disposed within the boring tool. A receiver is typically placed on the ground surface and used to determine the position of the tool through a conventional radio direction finding technique. However, since there is no synchronization between the beacon and the detector, the depth of the tool cannot be measured directly, and the position measurement of the boring tool is restricted to a two dimensional surface plane. Moreover, conventional radio direction finding techniques have limited accuracy in determining the position of the boring tool. These limitations can have severe consequences when boring a trenchless underground hole in an area which contains several existing underground utilities or other natural or man-made hazards, in which case the location of the boring tool must be precisely determined in order to avoid accidentally disturbing or damaging the utilities.

Recently the use of ground penetrating radar (GPR) for performing surveys along trenchless boring routes has been proposed. Ground-penetrating-radar is a sensitive technique for detecting even small changes in the subsurface dielectric constant. Consequently, the images generated by GPR systems contain a great amount of detail, much of it either unwanted or unnecessary for the task at hand. A major difficulty, therefore, in using GPR for locating a boring tool concerns the present inability in the art to correctly distinguish the boring tool signal from all of the signals generated by the other features, such signals collectively being referred to as clutter. Moreover, depending on the depth of the boring tool and the propagation characteristics of the intervening ground medium, the signal from the boring tool can be extremely weak relative to the clutter signal. Consequently, the boring tool signal may either be misinterpreted or undetectable.

It would be desirable to employ an apparatus for determining a location and an orientation of an underground boring tool with higher accuracy than is currently attainable given the present state of the technology.

SUMMARY OF THE INVENTION

The present invention relates to an apparatus and method for determining a location and an orientation of an underground boring tool by employment of a radar-like probe and detection technique. The boring tool is provided with a device which generates a specific signature signal in response to a probe signal transmitted from above the ground. Cooperation between the probe signal transmitter at ground level and the signature signal generating device provided at the underground boring tool results in accurate detection of the boring tool location and, if desired, orientation, despite the presence of a large background signal. Precision detection of the boring tool location and orientation enables the operator to accurately locate the boring tool during operation and, if provided with a directional capacity, avoid buried obstacles such as utilities and other hazards.

The signature signal produced by the boring tool may be generated either passively or actively, and may be a microwave or an acoustic signal. Further, the signature signal may be produced in a manner which differs from that used to produce the probe signal in one or more ways, including timing, frequency content, information content, or polarization.

In accordance with one embodiment, surveying the boring site, either prior to or during the boring operation, provides for the production of data associated with the characteristics of the ground medium subjected to the survey. The ground characteristic data acquired during the survey may be correlated with historical data which relate ground types to boring productivity, hence enabling estimates of boring productivity and overall cost to be made for the site subjected to the survey. Accurate surveys of planned boring pathways can be made and the position of the boring tool accurately measured during a boring operation for contemporaneous or subsequent comparison with the planned pathway. The direction of the boring tool may be adjusted in response to the measured position in order to maintain the boring tool along the planned pathway.

BRIEF DESCRIPTION OF THE DRAWINGS

FIG. 3 is a graph depicting time domain signature signal generation;

FIG. 4 is a graph depicting frequency domain signature signal generation;

FIG. 12 illustrates another embodiment of an orientation detector that produces an output indicative of an orientation of the underground boring tool;

FIGS. 13a–13b illustrate another embodiment of a passive orientation detector that produces a signature signal indicative of both the location and orientation of the underground boring tool;

FIG. 23 is an illustration of a boring site having a heterogeneous subsurface geology;

FIG. 24 is a system block diagram of a trenchless boring system control unit incorporating position indicators, a geographical recording system, various databases, and a geological data acquisition unit;

DETAILED DESCRIPTION OF THE EMBODIMENTS

Figure 1:
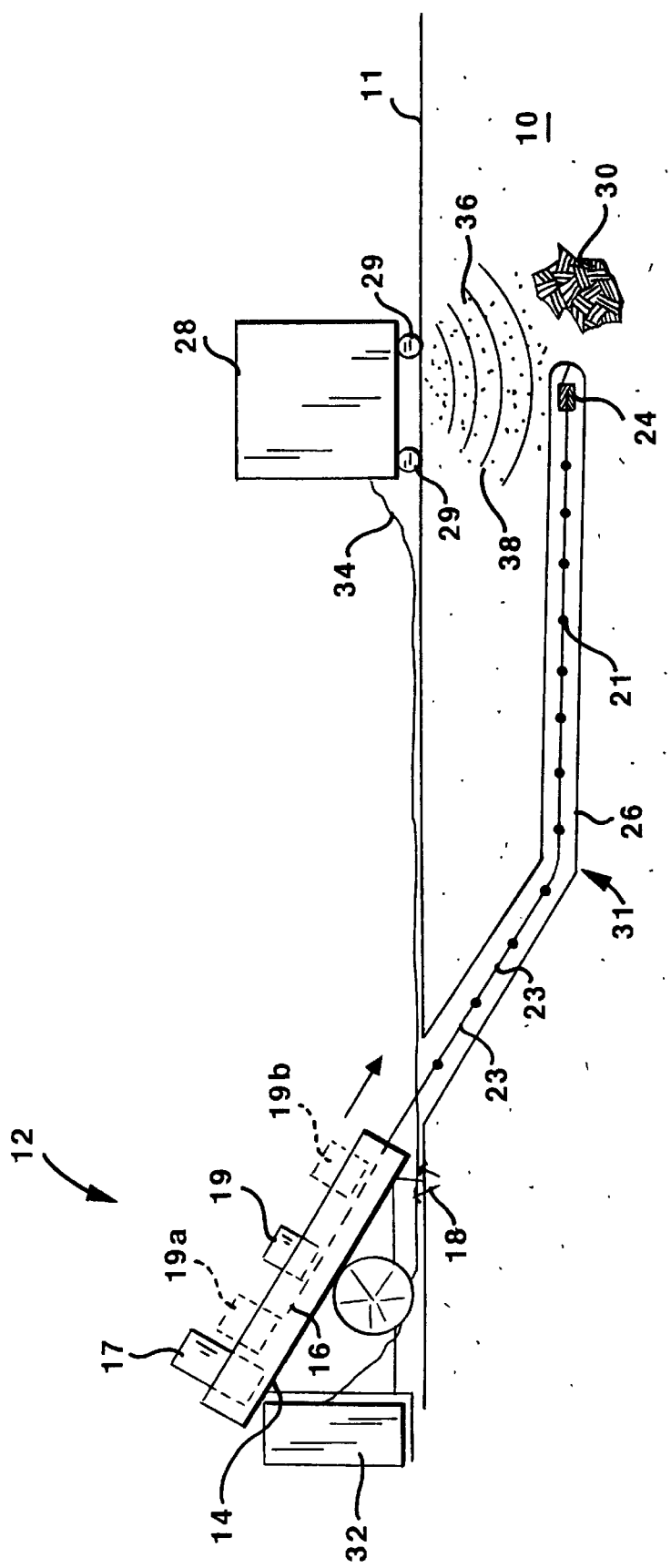
FIG. 1 is a side view of a trenchless underground boring apparatus in accordance with an embodiment of the present invention.

Referring now to the figures and, more particularly, to FIG. 1, there is illustrated an embodiment of a trenchless underground boring system incorporating a detection system for detecting a location and an orientation of an underground boring tool. The detection system includes an above-ground probing and detection unit 28 (PDU) and a below-ground cooperative target 20 mounted to, contained in, or otherwise coupled to an underground boring tool 24.

The PDU 28 and the target 20 operate in cooperation to provide reliable and accurate locating of an underground boring tool 24. In addition, the orientation of the boring tool 24 during operation may also be provided. In terms of general operation, the PDU 28 transmits a probe signal 36 into the ground 10 and detects return signals reflected from the ground medium, and the underground boring tool 24. The return signals typically includes content from many different reflection sources, often rendering detection of the underground boring tool 24 unreliable or impossible using conventional techniques. Detecting an underground boring tool 24 is greatly enhanced by use of the cooperative target 20, which, in response to the probe signal 36, emits a signature signal that is readily distinguishable from the return signals reflected by the ground medium and the underground boring tool 24. The cooperative target 20 may also include an orientation detection apparatus that senses an orientation of the boring tool 24. Boring tool orientation information may be transmitted with the location information as a composite signature signal or as an information signal separate from the signature signal. As such, the presence, location, and orientation of an underground boring tool 24 is readily and reliably determined by employing the probing and detection system and method of the present invention.

It is well known in the field of subsurface imaging that conventional underground imaging techniques, such as those that employ GPR, detect the presence of many types of underground obstructions and structures. It is also well known in the art that detecting objects of interest, such as an underground boring tool 24, is often made difficult or impossible due to the detection of return signals emanating from many sources not of interest, collectively known as clutter, associated with other underground obstructions, structures, and varying ground medium characteristics, for example. The clutter signal represents background noise in the composite return signal above which a return signal of interest must be distinguished. Attempting to detect the presence of the underground boring tool 24 using a conventional approach often renders the boring tool 24 undetectable or indistinguishable from the background noise.

It is understood that the return signal from an underground object of interest using conventional detection techniques may be weak relative to the clutter signal content. In such a case, the signal-to-clutter ratio would be low, which reduces the ability to clearly detect the return signal emanating from the underground object of interest. The probe and detection apparatus and method of the present invention advantageously provides for the production of a return signal from the cooperative target 20 provided at the underground boring tool 24 having a characteristic signature which can be more easily distinguished from the clutter. As will be discussed in detail hereinbelow, the generation of a signature signal containing either or both location and orientation information by the cooperative target 20 may be performed either passively or actively.

FIG. 1 illustrates a cross-section through a portion of ground 10 where the boring operation takes place, with most of the components of the detection system depicted situated above the ground surface 11. The trenchless underground boring system, generally shown as the system 12, includes a platform 14 on which is situated a tilted longitudinal member 16. The platform 14 is secured to the ground by pins 18 or other restraining members in order to prevent the platform 14 from moving during the boring operation. Located on the longitudinal member 16 is a thrust/pullback pump 17 for driving a drill string 22 in a forward, longitudinal direction as generally shown by the arrow. The drill string 22 is made up of a number of drill string members 23 attached end-to-end. Also located on the tilted longitudinal member 16, and mounted to permit movement along the longitudinal member 16, is a rotating motor 19 for rotating the drill string 22 (illustrated in an intermediate position between an upper position 19a and a lower position 19b). In operation, the rotating motor 19 rotates the drill string 22 which has a boring tool 24 at the end of the drill string 22.

A typical boring operation takes place as follows. The rotating motor 19 is initially positioned in an upper location 19a and rotates the drill string 22. While the boring tool 24 is rotated, the rotating motor 19 and drill string 17 are pushed in a forward direction by the thrust-pullback pump 20 toward a lower position into the ground, thus creating a borehole 26. The rotating motor 19 reaches a lower position 19b when the drill string 22 has been pushed into the borehole 26 by the length of one drill string member 23. A new drill string member 23 is then added to the drill string 22 either manually or automatically, and the rotating motor 19 is released and pulled back to the upper location 19a. The rotating motor 19 then clamps on to the new drill string member 23 and the rotation/push process is repeated so as to force the newly lengthened drill string 22 further into the ground, thereby extending the borehole 26. Commonly, water is pumped through the drill string 22 and back up through the borehole to remove cuttings, dirt, and other debris. If the boring tool 24 incorporates a directional steering capability for controlling its direction, a desired direction can be imparted to the resulting borehole 26.

In FIG. 1, there is illustrated a borehole 26 which bends in the vicinity of a point 31 after the initial oblique section becomes parallel to the ground surface 11. Located above the surface 11, and detachable from the trenchless underground boring system 12, is a probing and detection unit 28 (PDU), mounted on wheels 29 or tracks in order to permit above-ground traversing of the PDU 28 along a path corresponding to the underground path of the boring tool 24. The PDU 28 is coupled to a control unit 32 via a data transmission link 34.

Figure 2:
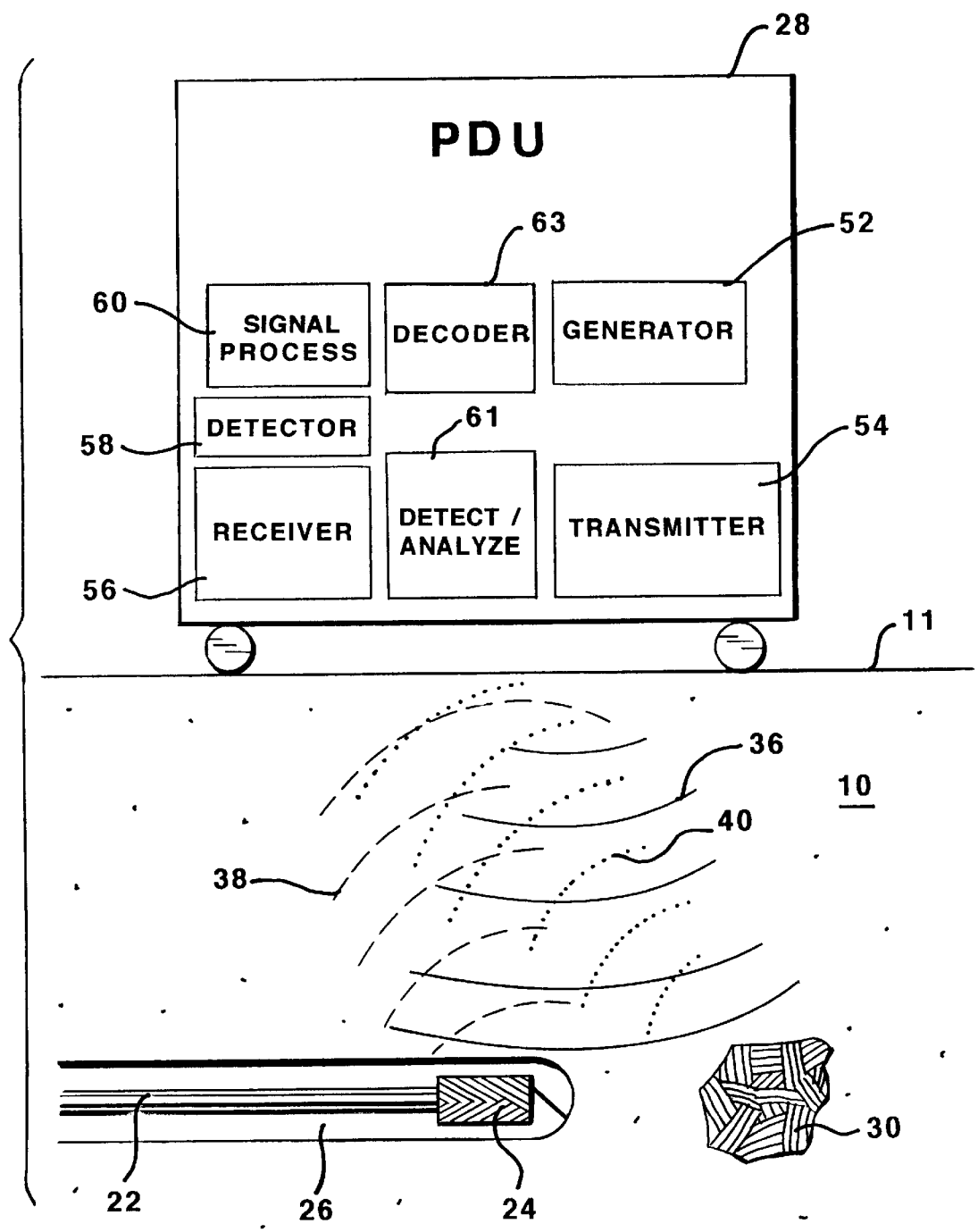
FIG. 2 is a detailed schematic side view of the trenchless underground boring tool and a probe and detection unit shown in FIG. 1.

The operation of the PDU 28 is more clearly described in reference to FIG. 2. The PDU 28 is generally used to transmit a probe signal 36 into the ground and to detect returning signals. The PDU 28 contains a generator 52 for generating the probe signal 36 which probes the ground 10. A transmitter 54 receives the probe signal 36 from the generator 52, which, in turn, transmits the probe signal 36 (shown as continuous lines in FIG. 2) into the ground 10. In a first embodiment, the generator 52 is a microwave generator and the transmitter 54 is a microwave antenna for transmitting microwave probe signals. In an alternative embodiment, the generator 52 is an acoustic wave generator and produces acoustic waves, and the transmitter 54 is typically a probe placed into the ground 10 to provide for good mechanical contact for transmitting the acoustic waves into the ground 10.

The probe signal 36 is transmitted by the PDU 28, propagates through the ground 10, and encounters subsurface obstructions, one of which is shown as 30, which scatter a return signal 40 (shown as dotted lines in FIG. 2) back to the PDU 28. A signature signal 38 (shown as dashed lines in FIG. 2) is also returned to the PDU 28 from the boring tool 24 located in the borehole 26.

The detection section of the PDU 28 includes a receiver 56, a detector 58, and a signal processor 60. The receiver 56 receives the return signals from the ground 10 and communicates them to the detector 58. The detector 58 converts the return signals into electric signals which are subsequently analyzed in the signal processing unit 60. In the first embodiment described hereinabove in which the probe signal 36 constitutes a microwave signal, the receiver 56 typically includes an antenna, and the detector 58 typically includes a detection diode. In another embodiment in which the probe signal 36 constitutes an acoustic wave, the receiver 56 typically is a probe in good mechanical contact with the ground 10 and the detector 58 includes a sound-to-electrical transducer, such as microphone. The signal processor 60 may include various preliminary components, such as a signal amplifier, a filtering circuit, and an analog-to-digital converter, followed by more complex circuitry for producing a two or three dimensional image of a subsurface volume which incorporates the various underground obstructions 30 and the boring tool 24. The PDU 28 also contains a beacon receiver/analyzer 61 for detecting and interpreting a signal from an underground active beacon. The function of the beacon receiver/analyzer 61 will be described more fully hereinbelow.

The PDU 28 also contains a decoder 63 for decoding information signal content that may be encoded on the signature signal produced by the cooperative target 20. Orientation, pressure, and temperature information, for example, may be sensed by appropriate sensors provided in the cooperative target 20, such as a strain gauge for sensing pressure. Such information may be encoded on the signature signal, such as by modulating the signature signal with an information signal, or otherwise transmitted as part of, or separate from, the signature signal. When received by the receiver 56, an encoded return signal is decoded by the decoder 61 to extract the information signal content from the signature signal content. It is noted that the components of the PDU 28 illustrated in FIG. 2 need not be contained within the same housing or supporting structure.

Referring once again to FIG. 1, the PDU 28 transmits acquired information along the data transmission link 34 to the control unit 32, which is illustrated as being located in proximity to the trenchless underground boring system 12. The data transmission link 34 is provided to handle the transfer of data between the PDU 28 and the trenchless underground boring system 12, and may be a co-axial cable, an optical fiber, a free-space link for infrared communication, or some other suitable data transfer medium or technique. A significant advantage of using a trenchless underground boring system 12 which employs the subsurface detection technique described herein concerns the detection of other important subsurface features which may purposefully be avoided by the boring tool 24, particularly buried utilities such as electric, water, gas, sewer, telephone lines, cable lines, and the like.

Signature signal generation, in accordance with the embodiments of FIGS. 3 and 4, may be accomplished using temporal and frequency based techniques, respectively. FIG. 3 is an illustration depicting the generation and detection of an underground boring tool signature signal in the time domain. Line A shows the emission of a probe signal 36a as a function of signal character plotted against time. Line B shows a return signal 62a detected by the PDU 28 in the absence of any signature signal generation. The return signal 62a is depictive of a signal received by the PDU 28 at a time ΔT1 after emission of the probe signal 36a, and is represented as a commixture of signals returned from the underground structure 22 and other scatterers. As previously discussed, a low signal-to-clutter ratio makes it very difficult to distinguish the return signal from the underground boring tool 24.

Line C illustrates an advantageous detection technique in which cooperation between the cooperative target 22, provided at the boring tool 24, and the PDU 28 is employed to produce and transmit a signature signal at a certain time ΔT2 following illumination with the probe signal 36a. In accordance with this detection scheme, the return signal 40a received from the scatterers is detected initially, and the signature signal 38a received from the underground boring tool 24 is detected after a delay of ΔT2. The delay time ΔT2 is established to be sufficiently long so that the signature signal produced by the cooperative target 20 is significantly more pronounced than the clutter signal at the time of detection. In this case, the signal-to-clutter ratio of the signature signal 38a is relatively high, thus enabling the signature signal 38a to be easily distinguished from the background clutter 40a.

FIG. 4 is an illustration depicting the detection of a cooperative target signature signal emitted from an underground boring tool 24 in the frequency domain. Line A illustrates the frequency band 36b of the probe signal as a function of signal strength plotted against frequency. Line B shows a frequency band 62b of a return signal received from the underground boring tool 24 in the absence of any cooperative signal generation. It can be seen that the naturally occurring return signals from the underground boring tool 24 and other scatterers 30 share a frequency band 62b similar to that of the probe signal 36b. Line C illustrates a case where cooperation is employed between the cooperative target 20 of the underground boring tool 24 and the PDU 28 to produce and transmit a signature signal which has a frequency band 38b different from that of the scattered return signal 40b. The difference in frequency band, indicated as Δf, is sufficiently large to move the cooperative target signature signal out of, or at least partially beyond, the scattered signal frequency band 40b. Thus, the cooperative target signature signal can be detected with relative ease due to the increased signal-to-clutter ratio. It is noted that high pass, low pass, and notch filtering techniques, for example, or other filtering and signal processing methods may be employed to enhance cooperative target signature signal detection.

It is an important feature of the invention that the underground boring tool 24 be provided with a signature signal-generating apparatus, such as a cooperative target 20, which produces a signature signal in response to a probe signal transmitted by the PDU 28. If no such signature signal was produced by the generating apparatus, the PDU 28 would receive an echo from the underground boring tool 24 which would be very difficult to distinguish from the clutter with a high degree of certainty using conventional detecting techniques. The incorporation of a signature signal generating apparatus advantageously provides for the production of a unique signal by the underground boring tool 24 that is easily distinguishable from the clutter and has a relatively high signal-to-clutter ratio. As discussed briefly above, an active or passive approach is suitable for generating the boring tool signature signal. It is understood that an active signature signal circuit is one in which the circuit used to generate the signature signal requires the application of electrical power from an external source, such as a battery, to make it operable. A passive circuit, in contrast, is one which does not utilize an external source of power. The source of energy for the electrical signals present in a passive circuit is the received probe signal itself.

In accordance with a passive approach, the cooperative target 20 does not include an active apparatus for generating or amplifying a signal, and is therefore generally less complex than an active approach since it does not require the presence of a permanent or replaceable power source or, in many cases, electronic circuitry. Alternatively, an active approach may be employed which has the advantage that it is more flexible and provides the opportunity to produce a wider range of signature response signals which may be more identifiable when encountering different types of ground medium. Further, an active approach reduces the complexity and cost of manufacturing the cooperative target 20, and may reduce the complexity and cost of the signature signal receiving apparatus.

Figure 5A:
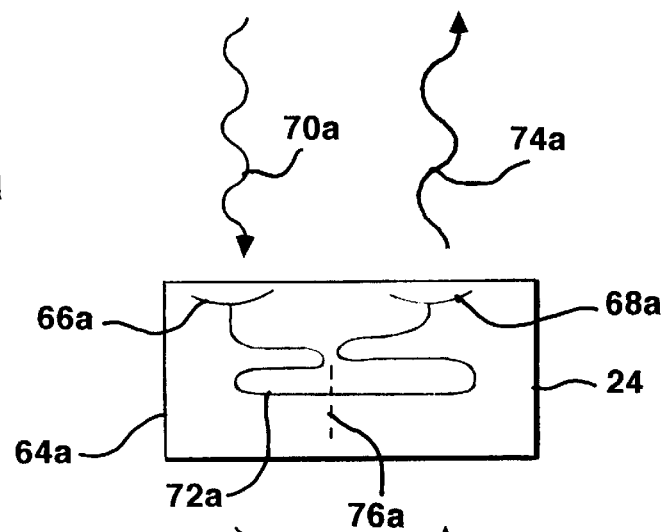
FIGS. 5a–5c show three embodiments for passive microwave signature signal generation.
Figure 5B:
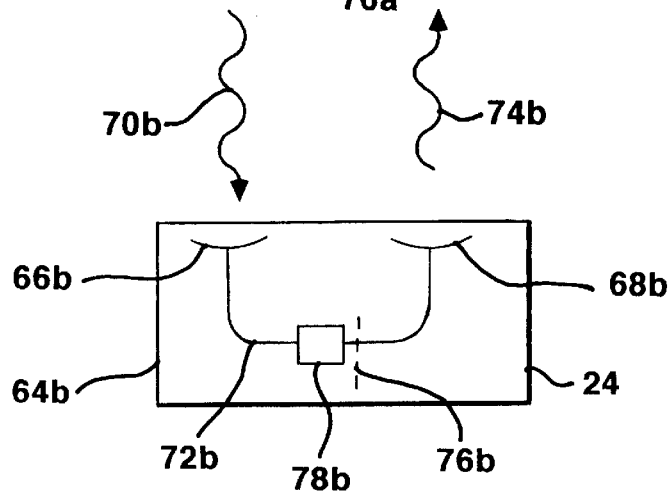
Figure 5C:
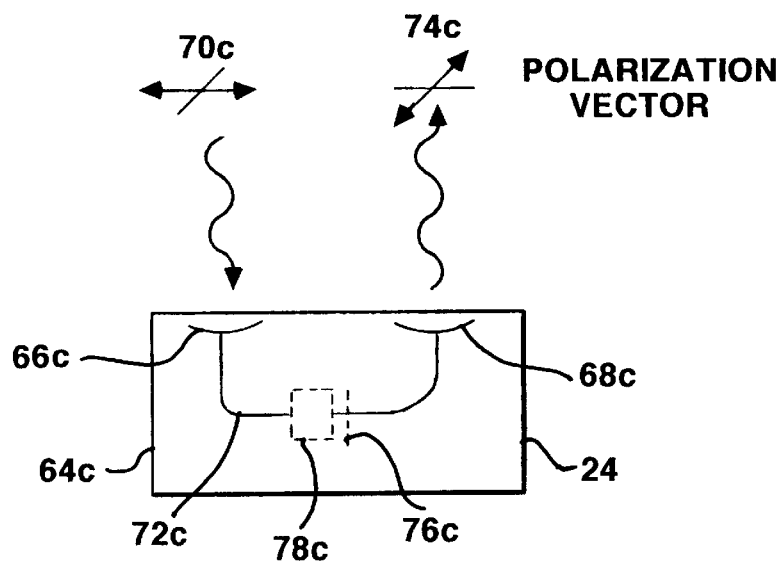

Three embodiments of a passive signature signal generating apparatus associated with a microwave detection technique are illustrated in FIG. 5. Each of the embodiment illustrations shown in FIG. 5 includes a schematic of a cooperative target 20 including a microwave antenna and circuit components which are used to generate the signature signal. The three embodiments illustrated in FIGS. 5a, 5b, and 5c are directed toward the generation of the signature signal using a) the time domain, b) the frequency domain and c) cross-polarization, respectively.

In FIG. 5a, there is illustrated a cooperative target 20 which includes two antennae, a probe signal receive antenna 66a, and a signature signal transmit antenna 68a. For purposes of illustration, these antennae are illustrated as separate elements, but it is understood that microwave transmit/receive systems can operate using a single antenna for both reception and transmission. Two separate antennae are used in the illustration of this and the following embodiments in order to enhance the understanding of the invention and, as such, no limitation of the invention is to be inferred therefrom. The receive antenna 66a and the transmit antenna 68a in the physical embodiment of the signature signal generator will preferably be located inside the cooperative target 20 or on its surface in a conformal configuration. For antennae located entirely within the cooperative target 20, it is understood that at least a portion of the cooperative target housing is made of a non-metallic material, preferably a hard dielectric material, thus allowing passage of the microwaves through at least a portion of the cooperative target housing. A material suitable for this application is KEVLAR®. Antennae that extend outside of the cooperative target housing may be covered by a protective non-metallic material. The antennae, in this configuration, may be made to conform to the housing contour, or disposed in recesses provided in the housing and covered with an epoxy material, for example.

The illustration of FIG. 5a shows the signature signal generation apparatus for a microwave detection system operating in the time domain. In accordance with this embodiment, a receive antenna 66a receives a probe signal 70a from the PDU 28, such as a short microwave burst lasting a few nanoseconds, for example. In order to distinguish a signature signal 74a from the clutter received by the PDU 28, the received probe signal 70a passes from the receive antenna 66a into a time-delaying waveguide 72a, preferably a co-axial cable, to a transmit antenna 68a. The signature signal 74a is then radiated from the transmit antenna 68a and received by the PDU 28. The use of the time-delay line, which preferably delays the response from the cooperative target 20 by about 10 nanoseconds, delays radiating the return signature signal 74a until after the clutter signal received by the PDU 28 has decreased in magnitude.

In accordance with another embodiment, a single antenna embodiment of the passive time domain signature generator could be implemented by cutting the waveguide at the point indicated by the dotted line 76a to form a termination. In this latter embodiment, the probe signal 70a propagates along the waveguide 72a until it is reflected by the termination located at the cut 76a, propagates back to the receive antenna 66a, and is transmitted back to the PDU 28. The termination could be implemented either as an electrical short, in which case the probe signal 70a would be inverted upon reflection, or as an open circuit, in which case the probe signal 70a would not be inverted upon reflection.

The introduction of a time delay to create the signature signal 74a makes the underground boring tool 24 appear deeper in the ground than it is in actuality. Since microwaves are heavily attenuated by the ground, ground penetrating radar systems have a typical effective depth range of about 10 feet when employing conventional detection techniques, beyond which point the signal returns are generally too heavily attenuated to be reliably detected. The production of a time delayed signature signal return 74a from the underground boring tool 24 artificially translates the depth of the underground boring tool 24 to an apparent depth in the range of 10 to 20 feet, a depth from which there is generally no other strong signal return, thus significantly enhancing the signal-to-clutter ratio of the detected signature signal 74a. The actual depth of the underground boring tool 24 may then be determined by factoring out the artificial depth component due to the known time delay associated with the cooperative target 20. It is believed that the signature signal generated by a cooperative target 20 may be detectable at actual depths on the order of 100 feet. It is further believed that a signature signal generated by an active device will generally be stronger, and therefore more detectable, than a signature signal produced by a passive device.

The illustration of FIG. 5b depicts a signature signal generating apparatus for a microwave detection system operating in the frequency domain. In accordance with this embodiment, a receive antenna 66b, provided in or on the boring tool 24, receives a microwave probe signal 70b from the PDU 28. The probe signal 70b is preferably a microwave burst, lasting for several microseconds, which is centered on a given frequency, f, and has a bandwidth of $\Delta f1$, where $\Delta f1/f$ is typically less than one percent. In order to shift a return signature signal 74b out of the frequency regime associated with the clutter received by the PDU 28, the received probe signal 70b propagates from the receive antenna 66b along a waveguide 72b into a nonlinear device 78b, preferably a diode, which generates harmonic signals, such as second and third harmonics, from an original signal.

The harmonic signal is then radiated from a transmit antenna 68b as the signature signal 74b and is received by the PDU 28. The PDU 28 is tuned to detect a harmonic frequency of the probe signal 70b. For a probe signal 70b of 100 MHz, for example, a second harmonic detector 58 would be tuned to 200 MHz. Generally, scatterers are linear in their response behavior and generate a clutter signal only at a frequency equal to that of the probe signal 70b. Since there is generally no other source of the harmonic frequency present, the signal-to-clutter ratio of the signature signal 74b at the harmonic frequency is relatively high. In a manner similar to that discussed hereinabove with respect to the passive time domain embodiment, the passive frequency domain embodiment may be implemented using a single antenna by cutting the waveguide at the point indicated by the dotted line 76b to form a termination. In accordance with this latter embodiment, the probe signal 70b would propagate along the waveguide 72b, through the nonlinear element 78b, reflect at the termination 76b, propagate back through the nonlinear element 78b, propagate back to the receive antenna 66b, and be transmitted back to the PDU 28. The polarity of the reflection would be determined by the nature of the termination, as discussed hereinabove.

The illustration of FIG. 5c depicts signature signal generation for a microwave detection system operating in a cross-polarization mode. In accordance with this embodiment, the PDU 28 generates a probe signal 70c of a specific linear polarity which is then transmitted into the ground. The clutter signal is made up of signal returns from scatterers which, in general, maintain the same polarization as that of the probe signal 70c. Thus, the clutter signal has essentially the same polarization as the probe signal 70c. A signature signal 74c is generated in the cooperative target 20 by receiving the polarized probe signal 70c in a receive antenna 66c, propagating the signal through a waveguide 72c to a transmit antenna 68c, and transmitting the signature signal 74c back to the PDU 28. The transmit antenna 68c is oriented so that the polarization of the radiated signature signal 74c is orthogonal to that of the received probe signal 70c. The PDU 28 may also be configured to preferentially receive a signal whose polarization is orthogonal to that of the probe signal 70c. As such, the receiver 56 preferentially detects the signature signal 74c over the clutter signal, thus improving the signature signal-to-clutter ratio.

In a manner similar to that discussed hereinabove with respect to the passive time and frequency domain embodiments, the cross-polarization mode embodiment may be implemented using a single antenna by cutting the waveguide at the point indicated by the dotted line 76c to form a termination and inserting a polarization mixer 78c which alters the polarization of the wave passing therethrough. In this latter embodiment, the probe signal would propagate along the waveguide 72c, through the polarization mixer 78c, reflect at the termination 76c, propagate back through the polarization mixer 78c, propagate back to the receive antenna 66c and be transmitted back to the PDU 28. The polarity of the reflection may be determined by the nature of the termination, as discussed previously hereinabove. It is understood that an antenna employed in the single antenna embodiment would be required to have efficient radiation characteristics for orthogonal polarizations. It is further understood that the cross-polarization embodiment may employ circularly or elliptically polarized microwave radiation. It is also understood that the cross-polarization embodiment may be used in concert with either the passive time domain or passive frequency domain signature generation embodiments described previously with reference to FIGS. 5a and 5b in order to further enhance the signal-to-clutter ratio of the detected signature signal.

Referring now to FIG. 6, active signature signal generation embodiments will be described. FIG. 6a illustrates an embodiment of active time domain signature signal generation suitable for incorporation in a boring tool 24. The embodiment illustrated shows a probe signal 82a being received by a receive antenna 84a which is coupled to a delay-line waveguide 86a. An amplifier 88a is located at a point along the waveguide 86a, and amplifies the probe signal 82a as it propagates along the waveguide 86a. The amplified probe signal continues along the delay-line waveguide 86a to the transmit antenna 90a which, in turn, transmits the signature signal 92a back to the PDU 28. FIG. 6b illustrates an alternative embodiment of the active time domain signature generator which incorporates a triggerable delay circuit for producing the time-delay, rather than propagating a signal along a length of time-delay waveguide. The embodiment illustrated shows a probe signal 82b being received by a receive antenna 84b coupled to a waveguide 86b. A triggerable delay circuit 88b is located at a point along the waveguide 86b. The triggerable delay circuit 88b operates in the following fashion. The triggerable delay circuit 88b is triggered by the probe signal 82b which, upon initial detection of the probe signal 82b, initiates an internal timer circuit. Once the timer circuit has reached a predetermined delay time, preferably in the range 1–20 nanoseconds, the timer circuit generates an output signal from the triggerable delay circuit 88b which is used as a signature signal 92b. The signature signal 92b propagates along the waveguide 86b to a transmit antenna 90b which then transmits the signature signal 92b to the PDU 28.

Figure 6A:
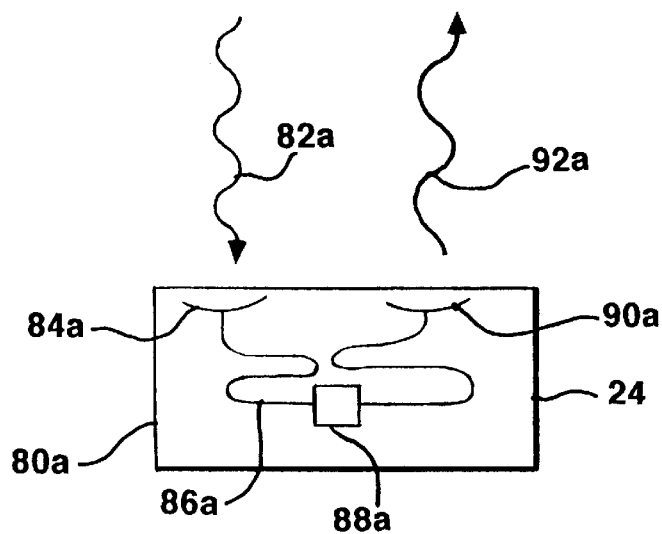
FIGS. 6a–6d show four embodiments for active microwave signature signal generation.
Figure 6B:
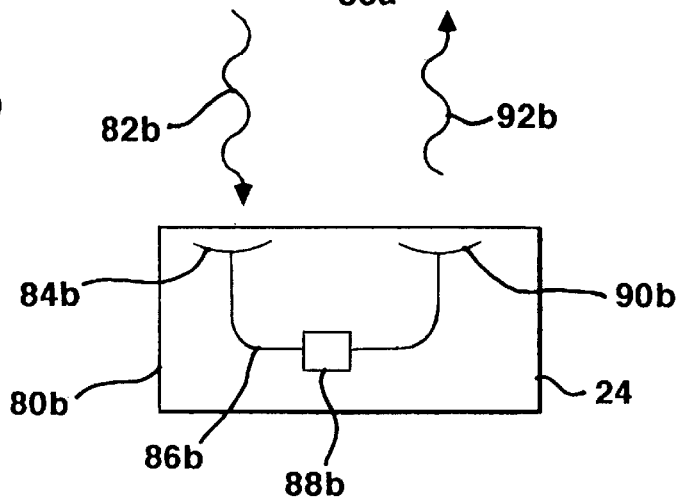
Figure 6C:
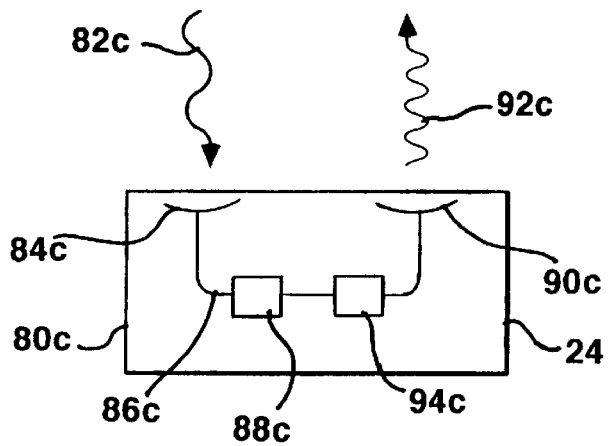

FIG. 6c illustrates an embodiment of an active frequency domain signature generator suitable for incorporation in or on an underground boring tool 24. The embodiment illustrated shows a probe signal 82c being received by a receive antenna 84c coupled to a waveguide 86c and a nonlinear element 88c. The frequency-shifted signal generated by the nonlinear element 88c is then passed through an amplifier 94c before being passed to the transmit antenna 90c, which transmits the signature signal 92c to the PDU 28. The amplifier 94c may also include a filtering circuit to produce a filtered signature signal at the output of the amplifier 94c. An advantage to using an active frequency domain signature signal generation embodiment over a passive frequency domain signature signal generation embodiment is that the active embodiment produces a stronger signature signal which is more easily detected.

In a second embodiment of the active frequency domain signature signal generator, generally illustrated in FIG. 6c, a probe signal 82c passes through the amplifier 94c prior to reaching the nonlinear element 88c. An advantage of this alternative embodiment is that, since the amplification process may take place at a lower frequency, the amplifier may be less expensive to implement.

Figure 6D:
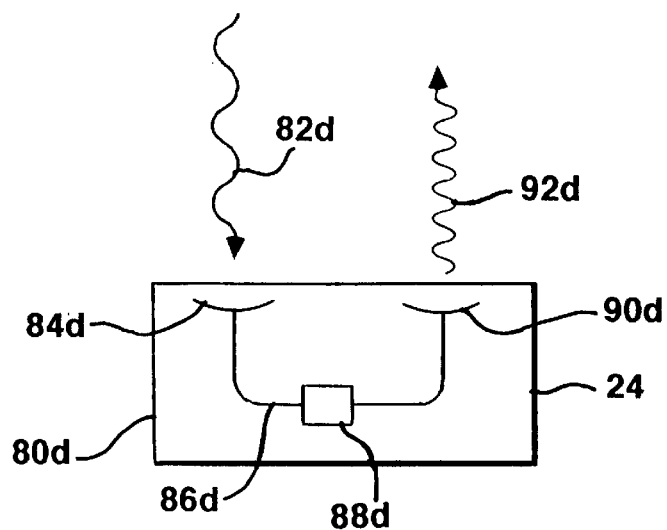

A third embodiment of an active frequency domain signature generator suitable for use with an underground boring tool 24 is illustrated in FIG. 6d. FIG. 6d shows a receive antenna 84d coupled through use of a waveguide 86d to a frequency shifter 88d and a transmit antenna 90d. The frequency shifter 88d is a device which produces an output signal 92d having a frequency of f2, which is different from the frequency, f1, of an input signal 82d by an offset $\Delta f$, where $f2=f1+\Delta f$. In accordance with this embodiment, $\Delta f$ is preferably larger than one half of the bandwidth of the probe signal 82d, typically on the order of 1 MHz. The frequency shifter 88d produces a frequency shift sufficient to move the signature signal 92d out of, or at least partially beyond, the frequency band of the clutter signal, thereby increasing the signal-to-clutter ratio of the detected signature signal 92d. For purposes of describing these embodiments, the term signature signal embraces all generated return signals from the cooperative target 20 other than those solely due to the natural reflection of the probe signal off of the underground boring tool 24.

Figure 7A:
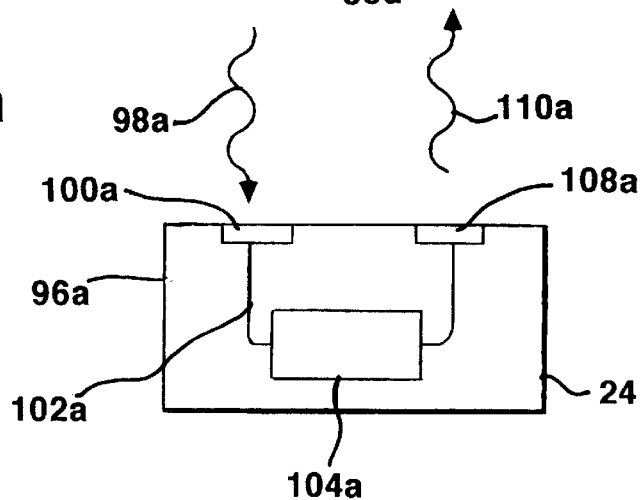
FIGS. 7a–7b show two embodiments for active acoustic signature signal generation.

FIG. 7 illustrates an embodiment of a signature signal generator adapted for use in a cooperative target 20 provided on or within an underground boring tool 24 where the probe signal is an acoustic signal. In an acoustic time-domain embodiment, as illustrated in FIG. 7a, an acoustic probe signal 98a, preferably an acoustic impulse, is received and detected by an acoustic receiver 100a mounted on the inner wall 96a of the boring tool 24. The acoustic receiver 100a transmits a trigger signal along a trigger line 102a to a delay pulse generator 104a. After being triggered, the delay pulse generator 104a generates a signature pulse following a triggered delay. The signature pulse is passed along the transmitting line 106a to an acoustic transmitter 108a, also mounted on the inner wall 96a of the boring tool 24. The acoustic transmitter 108a then transmits an acoustic signature signal 110a through the ground for detection by the PDU 28.

Figure 7B:
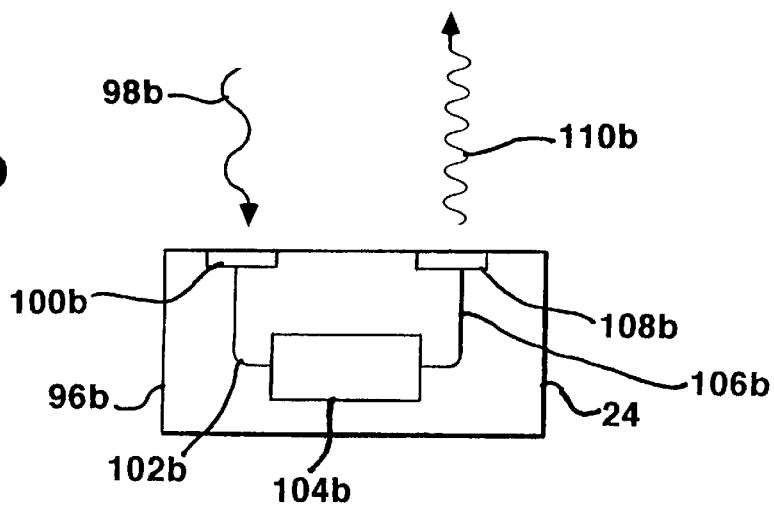

In accordance with an acoustic frequency-domain embodiment, as is illustrated in FIG. 7b, an acoustic probe signal 98b, preferably an acoustic pulse having a given acoustic frequency f3, is received and detected by an acoustic receiver 100b mounted on the inner wall 96b of the boring tool 24. The acoustic receiver 100b transmits an input electrical signal corresponding to the received acoustic signal 98b at a frequency f3 along a receive line 102b to a frequency shifter 104b. The frequency shifter 104b generates an output electrical signal having a frequency that is shifted by an amount $\Delta f3$ relative to the frequency of the input signal 98b. The output signal from the frequency shifter 104b is passed along a transmit line 106b to an acoustic transmitter 108b, also mounted on the inner wall 96b of the boring tool 24. The acoustic transmitter 108b then transmits the frequency shifted acoustic signature signal 110b through the ground for detection by the PDU 28.

Figure 8:
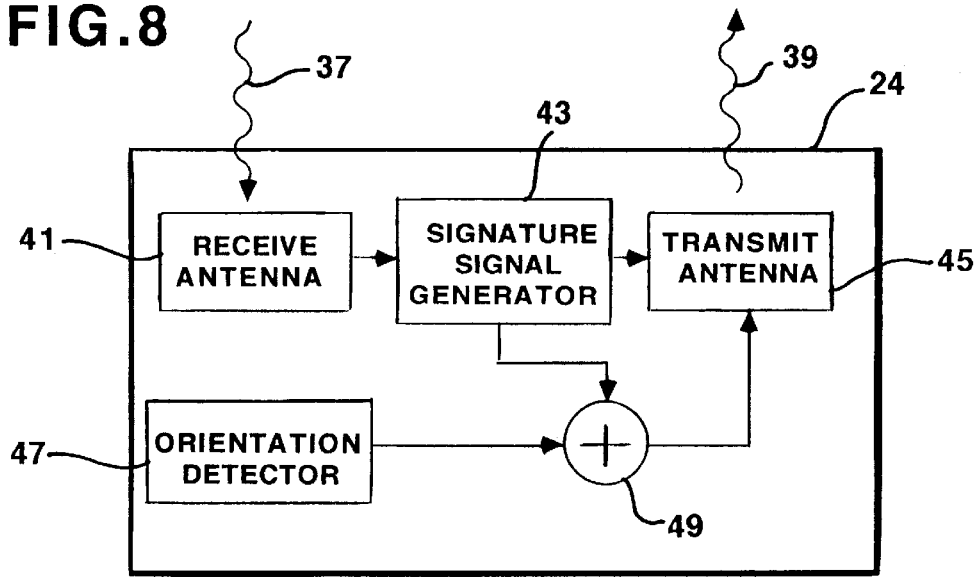
FIG. 8 shows an embodiment of a cooperative target incorporating a signature signal generator and an orientation detector.

In FIG. 8, there is illustrated in system block diagram form another apparatus for actively generating in a cooperative target 20 a signature signal that contains various types of information content. In one configuration, the signature signal generating apparatus of the cooperative target 20 includes a receive antenna 41, a signature signal generator 43, and a transmit antenna 45. In accordance with this configuration, a probe signal 37 produced by the PDU 28 is received by the receive antenna 41 and transmitted to a signature signal generator 43. The signature signal generator 43 alters the received probed signal 37 so as to produce a signature signal that, when transmitted by the transmit antenna 45, is readily distinguishable from other return and clutter signals received by the PDU 28. Alternatively, the signature signal generator 43, in response to the received probe signal 37, generates a signature signal different in character than the received probe signal 37. The signature signal transmitted by the transmit antenna 45 differs from the received probe signal 37 in one or more characteristics so as to be readily distinguishable from other return and clutter signals. By way of example, and as discussed in detail hereinabove, the signature signal produced by the signature signal generator 43 may differ in phase, frequency content, polarization, or information content with respect to other return and clutter signals received by the PDU 28.

Additionally, as is further illustrated in FIG. 8, the cooperative target 20 may include an orientation detector 47. The orientation detector 47 is a device capable of sensing an orientation of the cooperative target 20, and provides an indication of the orientation of the underground boring tool 24 during operation.

It may be desirable for the operator to know the orientation of the boring tool 24 when adjusting the direction of the boring tool 24 along an underground pathway, since several techniques known in the art for directing boring tools rely on a preferential orientation of the tool. If the boring tool 24 orientation is not known, the boring tool 24 cannot be steered in a preferred direction in accordance with such known techniques that require knowledge of boring tool 24 orientation. It may not be possible to determine the orientation of the boring tool 24 simply from a knowledge of the orientation of the members 23 of the drill string 22, since one or more members 23 of the drill string 22 may twist or slip relative to one another during the boring operation. Since the boring operation takes place underground, the operator has no way of detecting whether such twisting or slipping has occurred. It may, therefore, be important to determine the orientation of the boring tool 24.

The orientation detector 47 produces an orientation signal which is communicated to an encoder 49, such as a signal summing device, which encodes the orientation signal produced by the orientation detector 47 on the signature signal produced by the signature signal generator 43.

The encoded signature signal produced at the output of the encoder 49 is communicated to the transmit antenna 45 which, in turn, transmits the encoded signature signal 39 to the PDU 28. Various known techniques for encoding the orientation signal on the signature signal may be implemented by the encoder 49, such as by modulating the signature signal with the orientation signal. It is noted that other sensors may be included within the apparatus illustrated in FIG. 8 such as, for example, a temperature sensor or a pressure sensor. The outputs of such sensors may be communicated to the encoder 49 and similarly encoded on the signature signal for transmission to the PDU 28 or, alternatively, may be transmitted as information signals independent from the signature signal.

Figure 9:
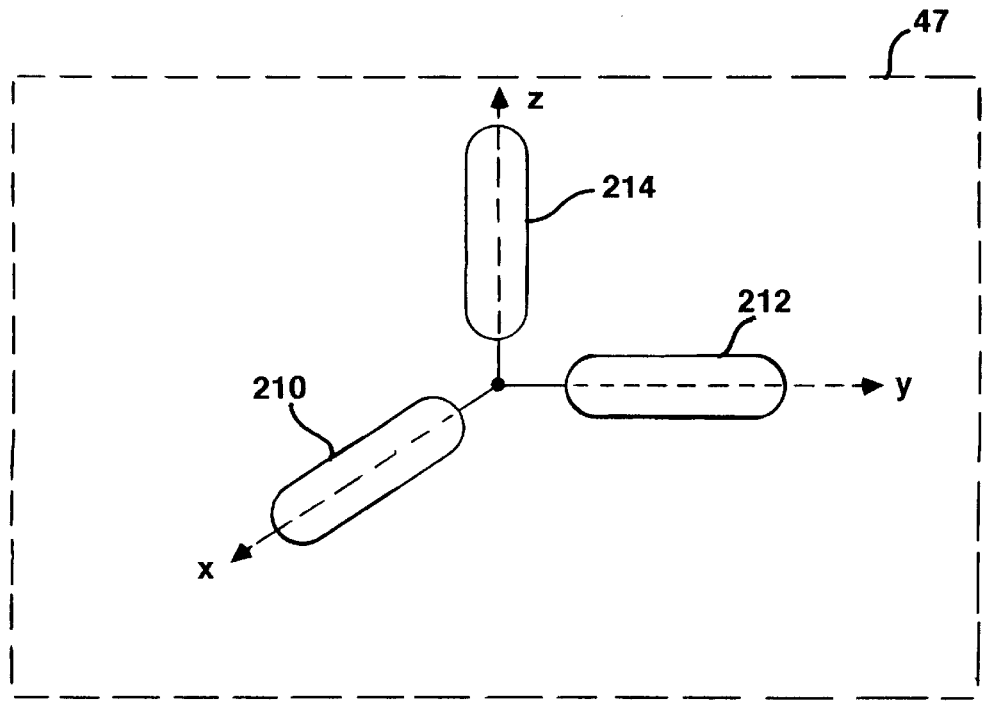
FIG. 9 is an illustration of an orientation detector for detecting an orientation of a cooperative target.

Referring to FIG. 9, there is illustrated an embodiment of an orientation detecting apparatus which may include up to three mutually orthogonally arranged orientation detectors. The orientation detectors 210, 212, and 214 are aligned along the x-axis, y-axis, and z-axis, respectively. In accordance with this embodiment, the orientation detector 210 detects changes in orientation with respect to the x-axis, while the orientation detector 212 senses changes in orientation with respect to the y-axis. Similarly, the orientation detector 214 detects changes in orientation with respect to the z-axis. Given this arrangement, changes in pitch, yaw, and roll may be detected when the cooperative target 20 is subject to positional changes. It is noted that a single orientation detector, such as detector 210, may be used to sense changes along a single axis, such as pitch changes in the boring tool 24, if multiple axis orientation changes need not be detected. Further, depending on the initial orientation of the cooperative target 20 when mounted to the underground boring tool 24, two orthogonally arranged orientation detectors, such as orientation detectors 210 and 212 aligned respectively along the x and y-axes, may be sufficient to provide pitch, yaw, and roll information.

Figure 10:
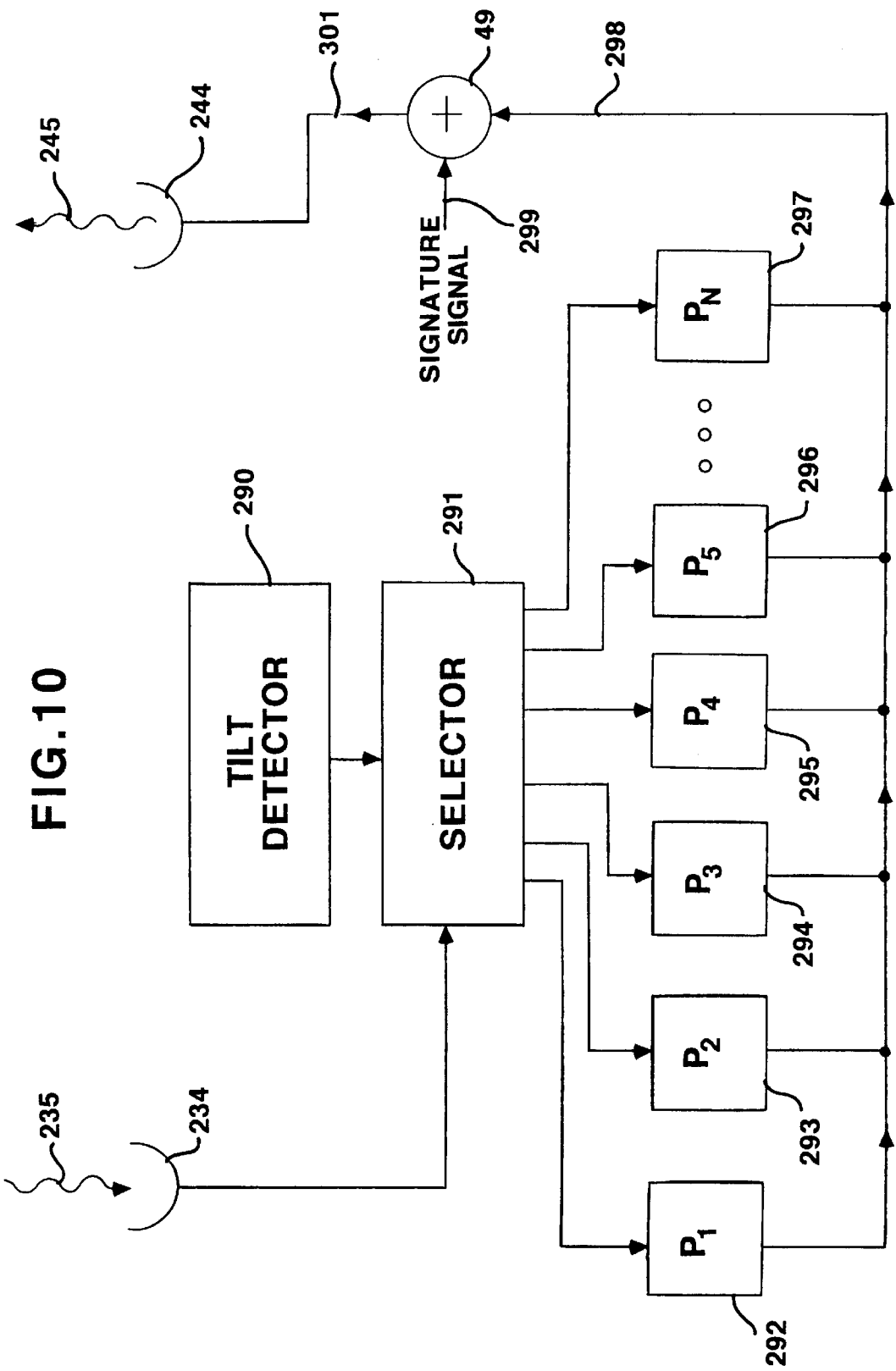
FIG. 10 is a block diagram of an orientation detector which, in accordance with one embodiment, detects an orientation of a cooperative target and produces an output indicative of such orientation, and, in accordance with another embodiment, produces an output signature signal that indicates both a location and an orientation of the underground boring tool.

Referring now to FIG. 10, there is illustrated an embodiment of an apparatus for detecting an orientation of an underground boring tool 24. In accordance with this embodiment, the cooperative target 20 provided on or within the underground boring tool 24 includes a tilt detector 290 that detects changes in boring tool orientation during boring activity. The cooperative target 20, in addition to producing a signature signal for purposes of determining boring tool location, may include an orientation detector, such as that illustrated in FIG. 10, for purposes of producing and orientation signal representative of an orientation of the cooperative target 20 and, therefore, the underground boring tool 24.

In one embodiment, as is illustrated in FIG. 8, the cooperative target 20 includes an orientation detecting apparatus, which produces an orientation signal, and a separate signature signal generator, which produces a signature signal. The signature signal and the orientation signal may be transmitted by the transmit antenna 45 of the cooperative target 20 as two separate information signals or, alternatively, as a composite signal which includes both the signature and orientation signals. Alternatively, the orientation detecting apparatus may produce a single signature signal that is indicative of both the location and the orientation of the cooperative target 20.

Referring in greater detail to FIG. 10, there is illustrated a tilt detector 290 coupled to a selector 291. The tilt detector 290 detects tilting of the cooperative target 20 with respect to one or more mutually orthogonal axes of the boring tool 24. It is believed that the tilt detector 290 illustrated in FIG. 10 is useful as a sensor that senses the pitch of the boring tool 24 during operation. The range of tilt angles detectable by the tilt detector 290 may be selected in accordance with the estimated amount of expected boring tool tilting for a given application. For example, the tilt detector 290 may detect maximum pitch angles in the range of ±45° relative to horizontal in one application, whereas, in another application, the tilt detector 290 may detect pitch angles in the range of ±90° relative to horizontal, for example. It is to be understood that the tilt detector 290, as well as other components illustrated in FIG. 10, may be active or passive components.

As is further illustrated in FIG. 10, a probe signal 235 is received by the receive antenna 234 which, in turn, communicates the probe signal 235 to a selector 291. The tilt detector 290 and selector 291 cooperate to select one of several orientation signal generators depending on the magnitude of tilting as detected by the tilt detector 290. In one embodiment, the probe signal 235 is coupled to each of the orientation signal generators $P_1$ 292 through $P_N$ 297, one of which is selectively activated by the tilt detector 290 which incorporates the function of the selector 291, such as the embodiment illustrated in FIG. 12. In another embodiment, the probe signal 235 is coupled to the selector 291 which activates one of the orientation signal generators $P_1$ 292 through $P_N$ 297 depending on the magnitude of tilting detected by the tilt detector 290.

By way of example, and in accordance with a passive component implementation, each of the orientation signal generators $P_1$ 292 through $P_N$ 297 represent individual transmission lines, each of which produces a unique time-delayed signature signal which, when transmitted by the transmit antenna 244, provides both location and orientation information when received by the PDU 28. As such, the orientation detection apparatus in accordance with this embodiment provides both location and orientation information and does not require a separate signature signal generator 43. In another embodiment, each of the orientation signal generators, such as orientation signal generator $P_3$ 294, produces a unique orientation signal which is transmitted to an encoder 49. A signature signal 299 produced by a signature signal generator 43 separate from the orientation detection apparatus may be input to the encoder 49, which, in turn, produces a composite signature signal 301 which includes both signature signal and orientation signal content. The composite signal 301 is then transmitted to the PDU 28 and decoded to extract the orientation signal content from the signature signal content.

As discussed previously, the range of tilt angles detectable by the tilt detector 290 and the resolution between tilt angle increments may vary depending on a particular application or use. By way of example, it is assumed that the tilt detector 290 is capable of detecting maximum tilt angles of ±60°. The selector 291 may select orientation signal generator $P_1$ 292 when the tilt detector 290 is at a level or null state (i.e., 0° tilt angle) relative to horizontal. When selected, orientation detector $P_1$ 292 generates a unique orientation signal which is indicative of an orientation of 0°. As previously discussed, the orientation signal may be combined with a signature signal produced by a separate signature signal generator 43 or, alternatively, may provide both signature signal and orientation signal information which is transmitted to the PDU 28.

In the event that the tilt detector 290 detects a positive 5° tilt angle change, for example, orientation signal generator $P_2$ 293 is selected by the selector 291. The orientation signal generator $P_2$ 293 then produces an orientation signal that indicates a positive 5° tilt condition. Similarly, orientation signal generators $P_3$ 294, $P_4$ 295, and $P_5$ 296 may produce orientation signals representing detected tilt angle changes of positive 10°, 15°, and 20°, respectively. Other orientation signal generators may be selected by the selector 291 to produce orientation signals representing tilt angle changes in five degree increments between 25° and 60°. Negative tilt angles between 0° and −60° in 5° increments are preferably communicated to the PDU 28 by selection of appropriate orientation signal generators corresponding to the magnitude of negative tilting. It will be appreciated that the range and resolution between tilt angle increments may vary depending on a particular application.

Figure 11A:
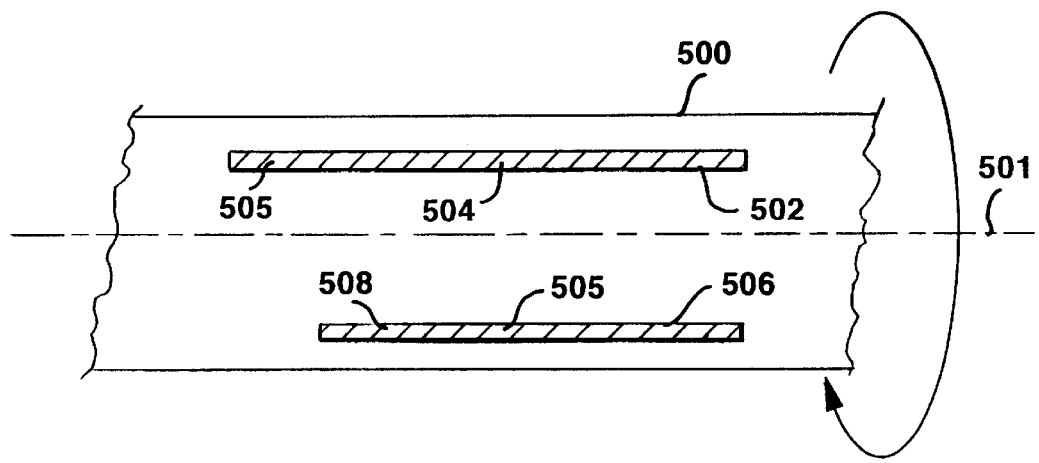
FIGS. 11a–11b illustrate an embodiment of an orientation detecting apparatus which includes a number of passive signature signal generating devices that provide both boring tool location and orientation information.
Figure 11B:
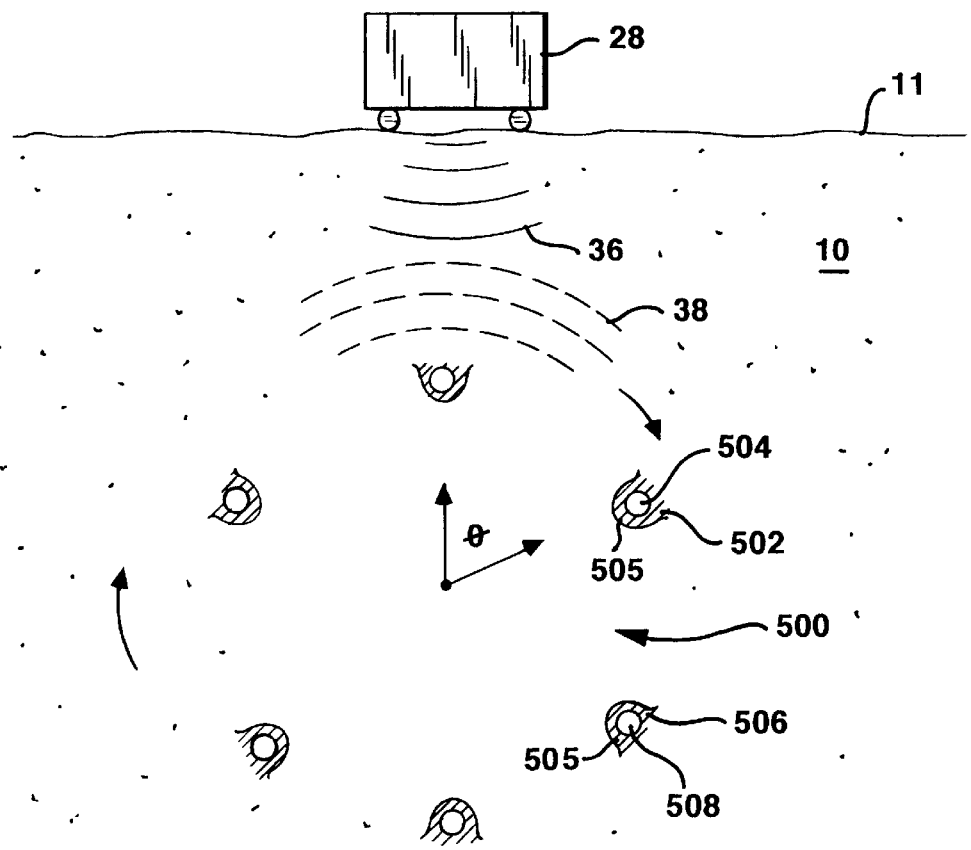

In FIGS. 11a and 11b, there is illustrated another embodiment of an underground boring tool 500 equipped with a signature signal generating apparatus which, in addition to providing location information, provides boring tool orientation information. Referring to FIG. 11a, the boring tool 500 includes a longitudinal axis 501 about which the boring tool 500 rotates during boring activity. Distributed about the periphery of the boring tool 500 are a number of a signature signal generating devices, such as devices 504 and 508. In accordance with this embodiment, the signature signal generating devices operate passively and, as such, do not require an external power supply. Each of the signature signal generating devices distributed about the boring tool 500 produces a unique signature signal in response to a received probe signal generated by the PDU 28.

As is further illustrated in FIG. 11b, the boring tool 500 includes a number of elongated recesses or channels within which signature signal generating devices are disposed. In FIG. 11b, there is shown a cross-sectional view of the boring tool 500 illustrated in FIG. 11a. A signature signal generating device 504, such as a co-axial transmission line, for example, is disposed in a recess 502 and encased in a protective material 505 which permits passage of electromagnetic signals therethrough. The protective material 505 fixes the signature signal generating device 504 within the channel 502. Also shown in FIG. 11b is a second signature signal generating device 508 similarly disposed in a recess 506 and encased in a protective material 505. A hard dielectric material, such as KEVLAR®, is a material suitable material for this application.

During operation, the boring tool 500 is rotated at an appropriate drilling rate which, assuming a full 360° rotation, exposes each of the signature signal generating devices to a probe signal 36 produced by the PDU 28. When exposed to the probe signal 36 during rotation, each of the signature signal generating devices will emit a characteristic or signature signal 38 in response to the probe signal 36. As a particular signature signal generating device rotates beyond a reception window within which the probe signal 36 is received and a signature signal 38 generated, the bulk metallic material of the boring tool 500 shields such a signature signal generating device from the probe signal 36. It may be desirable to situate the signature signal generating devices about the periphery of the boring tool 500 such that the signature signal produced by the signature signal detecting device exposed to the probe signal 36 produces the predominant signature signal 38 received by the PDU 28. It may further be desirable to provide for a null or dead zone between adjacent signature signal generating devices so that the only signature signal 38 received by the PDU 28 is that produced by a single signature signal generating device currently exposed to the probe signal 38.

The type of signature signal generating device, configuration of the boring tool recesses, such as recess 502, the type of protective material 505 employed, the number and location of signature signal generating devices used, and the rotation rate of the boring tool 500 will typically impact the ability of the PDU 28 to detect the signature signal 38 produced by each of the signature signal generating devices during boring tool rotation.

Turning now to FIG. 12, there is illustrated an embodiment of an orientation detector suitable for use in both active and passive signature signal generating apparatuses. In one embodiment, a mercury sensor 220 may be constructed having a bent tube 221 within which a bead of mercury 222 moves as the tube 221 tilts within a plane defined by the axes 223 and 225. Pairs of electrical contacts, such as contacts 227 and 229, are distributed along the base of the tube 221. As the tube 221 tilts, the mercury bead 222 is displaced from an initial or null point, generally located at a minimum bend angle of the tube 221. As the bead 222 moves along the tube base, electrical contact is mad between electrical contact pairs 227 and 229 distributed along the tube base. As the amount of tube tilting increases, the mercury bead 222 is displaced further from the null point, thus completing electrical circuit paths for contact pairs located at corresponding further distances from the null point. As such, the incremental change in tilt magnitude may be determined by detecting continuity in the contact pair over which the mercury bead 222 is situated.

In one embodiment, sixty-four of such contact pairs are provided along the base of the tube 221 to provide 64-bit tilt resolution information. An electrical circuit or logic (not shown) is coupled to the pairs of electrical contacts 227 and 229 which provides an output indicative of the magnitude of tube tilting, and thus an indication of the magnitude of the cooperative target orientation with respect to the plane defined by axes 223 and 225. It is appreciated that use of a mercury sensor 220 in accordance with this embodiment may require a power source. As such, this embodiment of an orientation detector is appropriate for use in active signature signal generating circuits. It is noted that the range of tilt angles detectable by the mercury sensor 220 is dependent on the bend angle α provided in the bent tube 221. The bend angle α, as well as the length of the tube 221, will also impact the detection resolution of mercury bead displacement within the tube 221.

In accordance with another embodiment of an orientation detector suitable for use in passive signature signal generating circuits, reference is made to FIGS. 12 and 13a–13b. The illustration of the apparatus depicted in FIG. 12 may be viewed in a context other than that previously described in connection with a mercury sensor embodiment. In particular, a metallic ball or other metallic object 222 is displaced within a tube 221 in response to tilting of the tube 221 within the plane defined by the axes 223 and 225. The movable contact 222 moves along a pair of contact rails 235a and 235b separated by a channel 237. The rails 235a and 235b include gaps 233 which separate one contact rail circuit from an adjacent contact rail circuit. As is illustrated in detail in FIGS. 13a–13b, each of the contact rail circuits is coupled to a pair of contacts 227 and 229 which, in turn, are coupled to a transmission line capable of producing a unique signature signal.

By way of example, and with particular reference to FIGS. 13a–13b, movable contact 222 is shown moving within the tube 221 between a first position $P_a$ and a second position $P_b$ in response to tilting of the tube 221. When the movable contact 222 is at the position $P_a$, continuity is established between contract 227, contact rail 235a, movable contact 222, contact rail 235b, and contact 229. As such, the circuit path including the transmission line $T_4$ 230 is closed. A probe signal 235 produced by the PDU 28 is received by the receive antenna 234 which communicates the probe signal along an input waveguide 232 and through the circuit path defined by contact 227, rail contact 235a, movable contact 222, rail contact 235b, and contact 229. The received probe signal 235 transmitted to the time-delaying waveguide $T_4$ 230 produces a time-delayed signature signal which is communicated to an output waveguide 242 and to a transmit antenna 244. The signature signal produced by the waveguide $T_4$ 230 is then received by the PDU 28. The PDU 28 correlates the signature signal 245 with the selected signature signal waveguide, such as transmission line $T_4$ 230, and determines the magnitude of tube 221 tilting. Those skilled in the art will appreciate that various impedance matching techniques, such as use of quarter wavelength matching stubs and the like, may be employed to improve impedance matching within the waveguide pathways illustrated in FIGS. 13a–13b.

Figure 14:
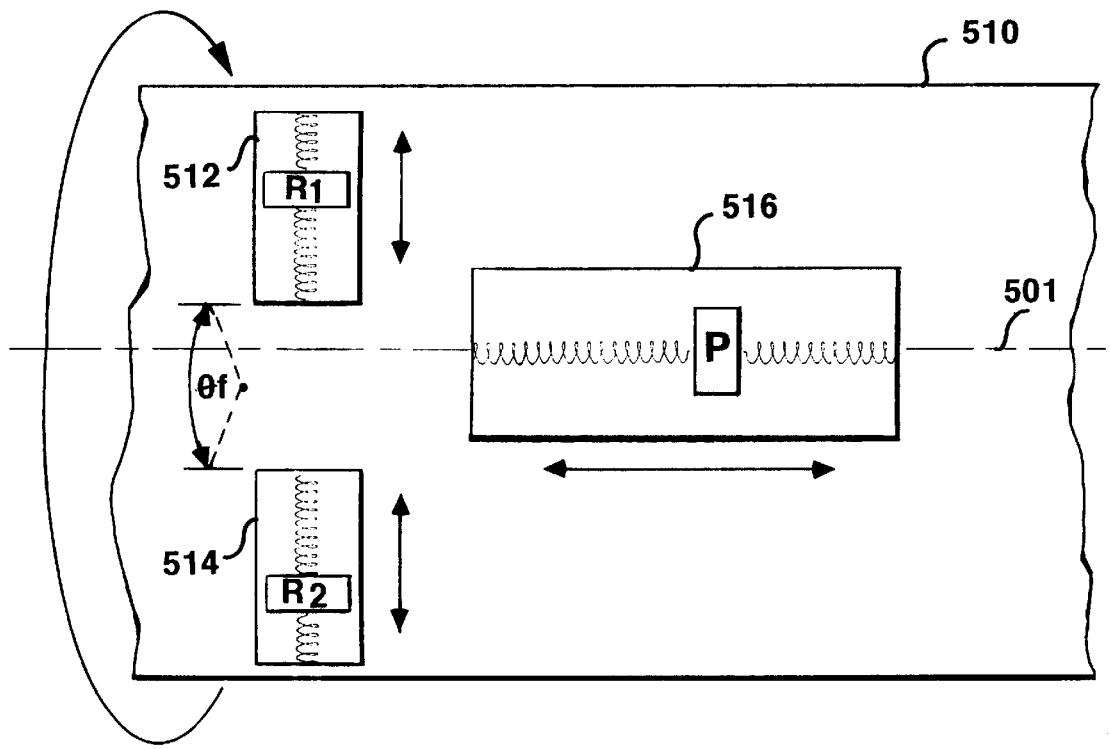
FIG. 14 illustrates an embodiment of an orientation detector suitable for incorporation in an underground boring tool that produces an output indicative of the rotational orientation and pitch of the boring tool.

Referring now to FIG. 14, there is illustrated another embodiment of an orientation detection apparatus suitable for detecting an orientation of an underground boring tool 510. In accordance with this embodiment, a number of rotation detectors, such as $R_1$ 512 and $R_2$ 514, are disposed at various radial locations about the periphery of the boring tool 510. The rotation detectors detect radial displacement of the boring tool 510 as the boring tool 510 rotates about its longitudinal axis 501. A pitch detector 516, oriented parallel with the longitudinal axis 501 of the boring tool 510, is susceptible to changes in boring tool pitch. In one embodiment, the rotation detectors, such as $R_1$ 512 and $R_2$ 514, and the pitch detector 516 are accelerometer-type sensors. Alternatively, the rotation and pitch detectors may constitute spring or strain gauge style sensors. Various other known displacement sensor mechanisms may also be employed.

The magnitude of the responsive of each rotation detector, such as detector $R_1$ 512, is typically dependent on the radial location of a particular rotation detector relative to earth's gravity vector as the boring tool 24 rotates about the longitudinal axis 501. The magnitude of the output produced by the pitch detector 516 is typically dependent on the degree of a boring tool pitch off of horizontal relative to the ground surface 11. The output signal produced by each of the rotation detectors and the pitch detector may be encoded onto the signature signal produced by the signature signal generating apparatus provided on the boring tool 510 or, alternatively, transmitted to the PDU 28 as a separate information signal.

Figure 21B:
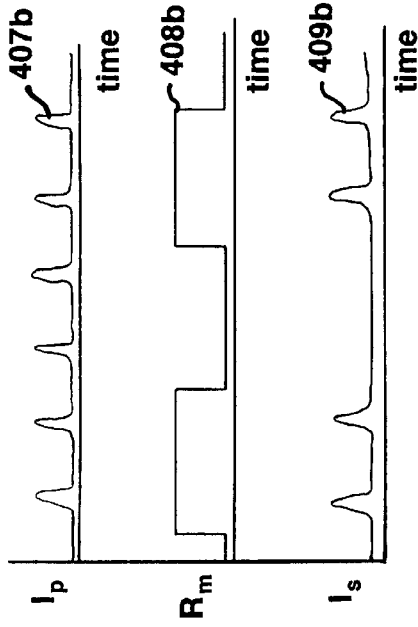
FIGS. 21a–d illustrate an embodiment of a trenchless underground boring tool incorporating various sensors, and further depicts sensor signal information.
Figure 21D:
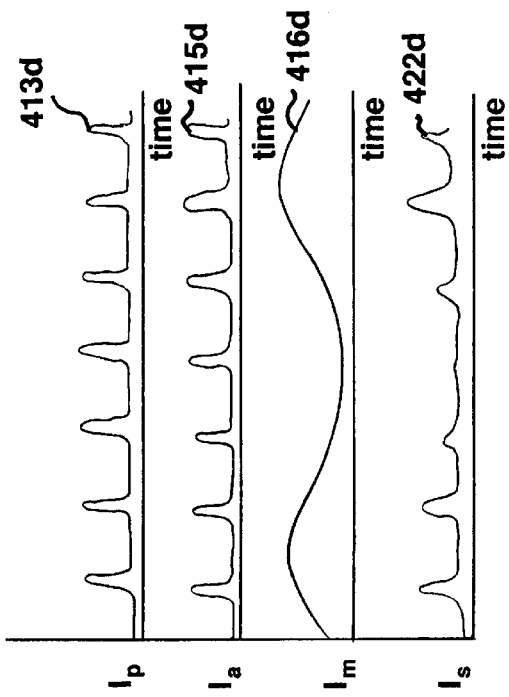
Figure 21A:
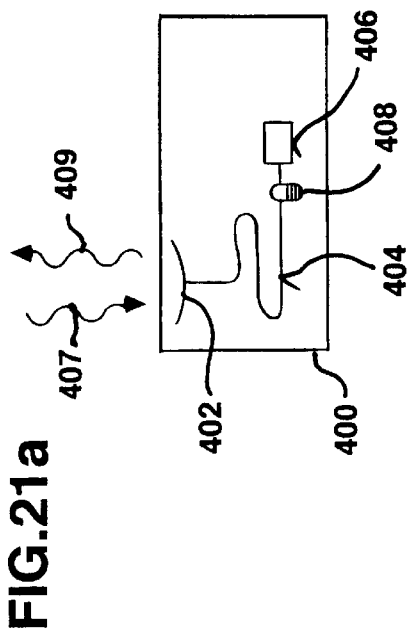

FIG. 21a illustrates yet another embodiment of an orientation sensing apparatus suitable for use with a boring tool 400. The boring tool 400 incorporates a passive time domain signature signal circuit including a single antenna 402, connected via a time delay line 404 to a termination 406, as discussed hereinabove with respect to FIG. 5a. The circuit illustrated in FIG. 21a also includes a mercury switch 408 located at a point along the delay line 404 close to the termination 406. The termination 406 also includes a dissipative load. When the boring tool 400 is oriented so that the mercury switch 408 is open, the time domain signature signal is generated by reflecting an incoming probe signal 407 at the open circuit of the mercury switch 408. When the boring tool 400 is oriented so that the mercury switch 408 is closed, the circuit from the antenna 402 is completed to the dissipative load 406 through the delay line 404. The probe signal 407 does not reflect from the dissipative load 406 and therefore no signature signal is generated. The generation of the signature signal 409 received by the PDU 28 is shown as a function of time in FIG. 21b. The $I_p$ trace 407b shows the probe signal 407, $I_p$, plotted as a function of time.

As the boring tool 400 rotates and moves along an underground path, the resistance, Rm, of the mercury switch 408 alternates from low to high values, as shown in the center trace 408b. The regular opening and closing of the mercury switch 408 modulates the signature signal 409b, $I_s$, received at the surface. The modulation maintains a constant phase relative to a preferred orientation of the boring tool 24. The lower trace does not illustrate the delaying effects of the time delay line 404 since the time scales are so different (the time delay on the signature signal 409 is of the order of 10 nanoseconds, while the time taken for a single rotation of the boring tool 24 is typically between 0.1 and 1 second). Detection of the modulated signature signal 409 by the PDU 28 allows the operator to determine the orientation of the boring tool head. It is understood that the other embodiments of signature signal generation described hereinabove can also incorporate a mercury switch 408 and, preferably, a dissipative load 406 in order to generate a modulated signature signal 409 for purposes of detecting the orientation of the boring tool 24.

Figure 15:
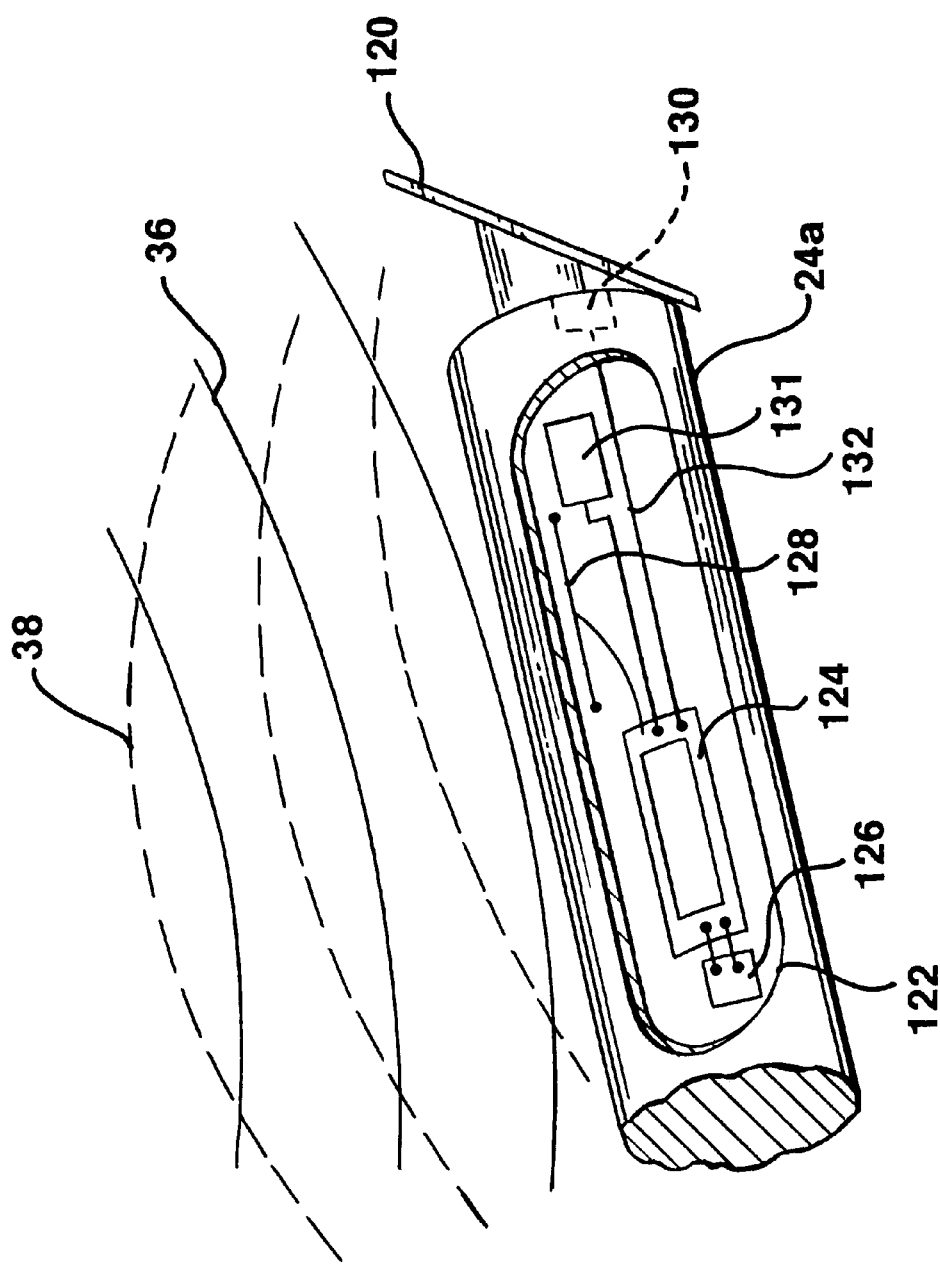
FIG. 15 shows an embodiment of a boring tool incorporating an active signature signal generator and an orientation detection apparatus.

In FIG. 15, there is illustrated an apparatus for actively generating a signature signal and an orientation signal in an underground boring tool 24. There is shown the head of a boring tool 24a. At the front end of the boring tool 24a is a cutter 120 for cutting through soil, sand, clay, and the like when forming an underground passage. A cut-away portion of the boring tool wall 122 reveals a circuit board 124 which is designed to fit inside of the boring tool 24a. Attached to the circuit board 124 is a battery 126 for providing electrical power. Also connected to the circuit board 124 is an antenna 128 which is used to receive an incoming probe signal 36 and transmit an outgoing signature signal 38. The antenna 128 may be located inside the boring tool 24a or may be of a conformal design located on the surface of the boring tool 24a and conforming to the surface contour. The boring tool 24a may also contain one or more sensors for sensing the environment of the boring tool 24a. Circuitry is provided in the boring tool 24a for relaying this environmental information to the control unit 32 situated above-ground. The sensors, such as an orientation sensor 131, may be used to measure, for example, the orientation of the boring tool 24a, (pitch, yaw, and roll) or other factors, such as the temperature of the cutting tool head or the pressure of water at the boring tool 24a.

In FIG. 15, there is illustrated a sensor 130, such as a pressure sensor, located behind the cutter 120. An electrical connection 132 runs from the sensor 130 to the circuit board 124 which contains circuitry for analyzing the signal received from the sensor 130. The circuit board 124 may modulate the signature signal 38 to contain information relating to the sensor output or, alternatively, may generate separate sensor signals which are subsequently detected and analyzed above-ground. Also depicted is an orientation sensor 131 which produces an orientation signal indicative of an orientation of the boring tool 24, such as the lateral position or deviation of the boring tool 24 relative to a predefined underground path or, by way of further example, the pitch of the boring tool 24 relative to horizontal.

Figure 16:
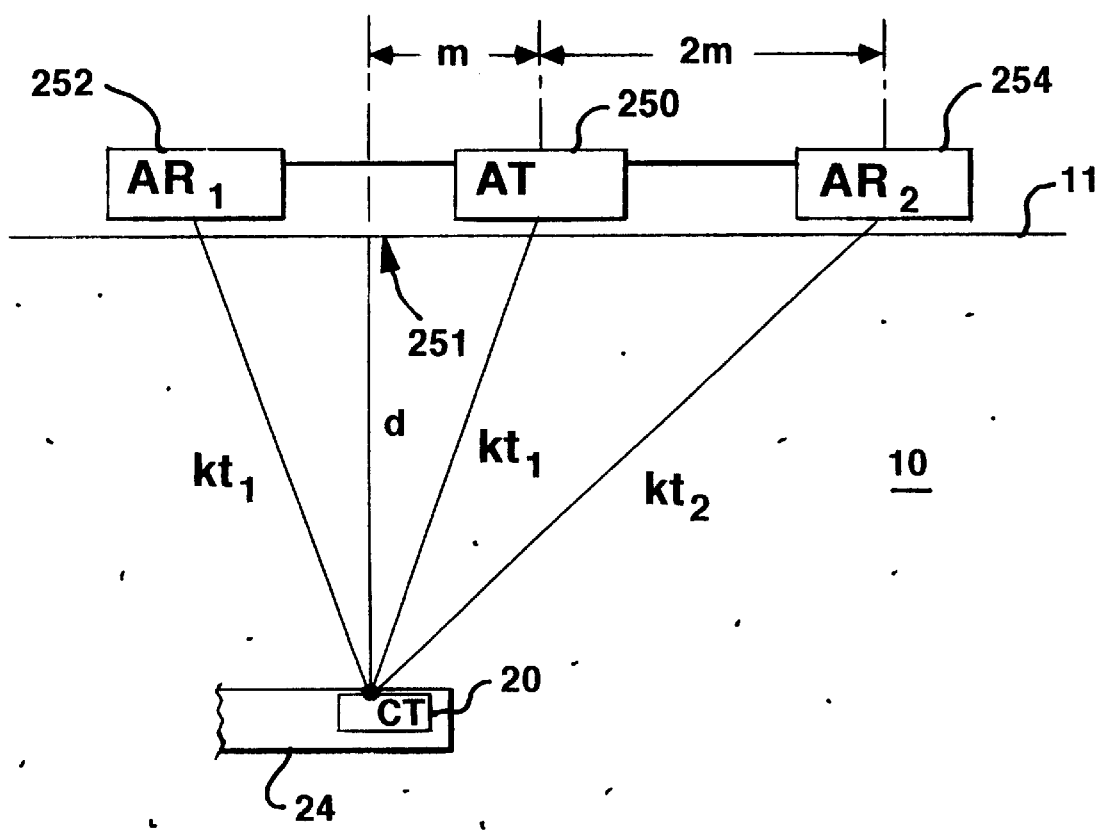
FIG. 16 is a diagram of a methodology for determining the depth of an underground boring tool incorporating a cooperative target by use of at least two receive antennas and a single transmit antenna.

A methodology for detecting the depth of a boring tool 24 incorporating a cooperative target 20 in accordance with one embodiment is illustrated in FIG. 16. In accordance with this embodiment, the PDU 28 includes a transmit antenna 250 and two receive antennas, $AR_1$ 252 and $AR_2$ 254. Each of the receive antennas $AR_1$ 252 and $AR_2$ 254 is situated a known distance 2m from the transmit antenna AT 250. It is assumed for purposes of this example that the propagation rate K through the ground medium of interest is locally constant. Although this assumption may introduce a degree of error with respect to actual or absolute depth boring tool, any such error is believed to be acceptable given the typical application or use of the boring tool cooperative detection technique described here. In other applications, absolute depth determinations may be desired. In such a case, the local propagation rate K, or dielectric constant, may be empirically derived, one such procedure being described hereinbelow.

Returning to FIG. 16, the time-of-flight, $t_1$, of the signal traveling between the cooperative target 20 of the boring tool 24 and the receive antenna AR 252, and between the transmit antenna 250 and the cooperative target 20 of the boring tool 24 is determined when the cooperative target 20 is positioned below the centerline of the antennas $AR_1$ 252 and AT 250. The travel time of the signal traveling between the cooperative target 20 and the receive antenna $AR_2$ 254 is indicated as the time $t_2$. The depth d of the boring tool 24 that incorporates the cooperative target 20 may then be determined by application of the following equations:

$$d^2 = K^2(t_1^2) - m^2 \qquad [1]$$

$$d^2 = K^2(t_2^2) - 9m^2 \qquad [2]$$

$$K^2(t_2^2) - K^2(t_1^2) = 8m^2 \qquad [3]$$

$$K^2(t_2^2 - t_1^2) = 8m^2 \quad [4]$$

$$K^2 = [8m^2/(t_2^2 - t_1^2)] \qquad [5]$$

$$d^2 = [8m^2/(t_2^2 - t_1^2)](t_1^2) - m^2 \qquad [6]$$

$$d = m[(8t_1^2/(t_2^2 - t_1^2)) - 1]^{\frac{1}{2}} \qquad [7]$$

In accordance with an alternative approach for determining the depth d of a cooperative target 20, depth calculations may be based on field-determined values for characteristic soil properties, such as the dielectric constant and wave velocity through a particular soil type. A simplified empirical technique that may be used when calibrating the depth measurement capabilities of a particular GPR system involves coring a sample target, measuring its depth, and relating it to the number of nanoseconds it takes for a wave to propagate through the core sample.

For an embodiment of the invention which uses a microwave probe signal, a general relationship for calculating the depth or dielectric constant from the time of flight measurement is described by the following equation:

$$TE = TF - TD = \sum \frac{d_j \sqrt{\varepsilon_j}}{c} \qquad [8]$$

where, TE is an effective time-of-flight, which is the duration of time during which a probe signal or signature signal is traveling through the ground; TF is the measured time-of-flight; TD is the delay internal to the cooperative target between receiving the probe signal and transmitting the signature signal; $d_j$ is the thickness of the jth ground type above the cooperative target; $\varepsilon_j$ is the average dielectric constant of the jth ground type at the microwave frequency; and c is the speed of light in a vacuum. It is important to know the dielectric constant since it provides information related to the type of soil being characterized and its water content. Having determined the dielectric constant of a particular soil type, the depth of the boring tool 24 traversing through similar soil types can be directly derived by application of the above-described equations.

A methodology for detecting the location of an underground boring tool 24 as the boring tool 24 creates or otherwise travels along an underground path is illustrated in FIGS. 17a–17b and 18a–18b. With reference to these figures and to FIG. 1, an underground boring operation is depicted in which a boring tool 24 is shown excavating the ground 10 so as to create an underground path or borehole 26. The drill string 22 is increased in length during the boring operation typically by adding individual drill string members 23 to the drill string 22 in a manner previously discussed. As the drill string length is increased, and the boring tool 24 forced further into the ground 10, the PDU 28 is moved along a preferred above-ground path 41 at a speed approximately equal to the horizontal speed component of the boring tool 24.

In one embodiment, the PDU 28 repeatedly transmits a probe signal 36 into the ground 10 when moved along the path 41, which is received by the signature signal generating apparatus provided on or within the boring tool 24. In response to the probe signal 36, a signature signal 38 is transmitted at the boring tool 24 and received by the PDU 28. Any deviation taken by the boring tool 24 from the preferred above-ground path 41 is detected by the PDU 28. An appropriate course correction may be effected either manually or automatically by the trenchless underground boring system 12 in response to such a deviation, as will be discussed hereinbelow. While effecting a boring tool course change, the PDU 28 is moved along the path 41 so as to continue tracking the progress and direction of the boring tool 24 through the ground 10. In this manner, cooperation between the PDU 28, the boring tool 24, and the above-ground portion of the trenchless underground boring system 12 provide for reliable and accurate navigating and tracking of an underground boring tool 24 during excavation.

Figure 17A:
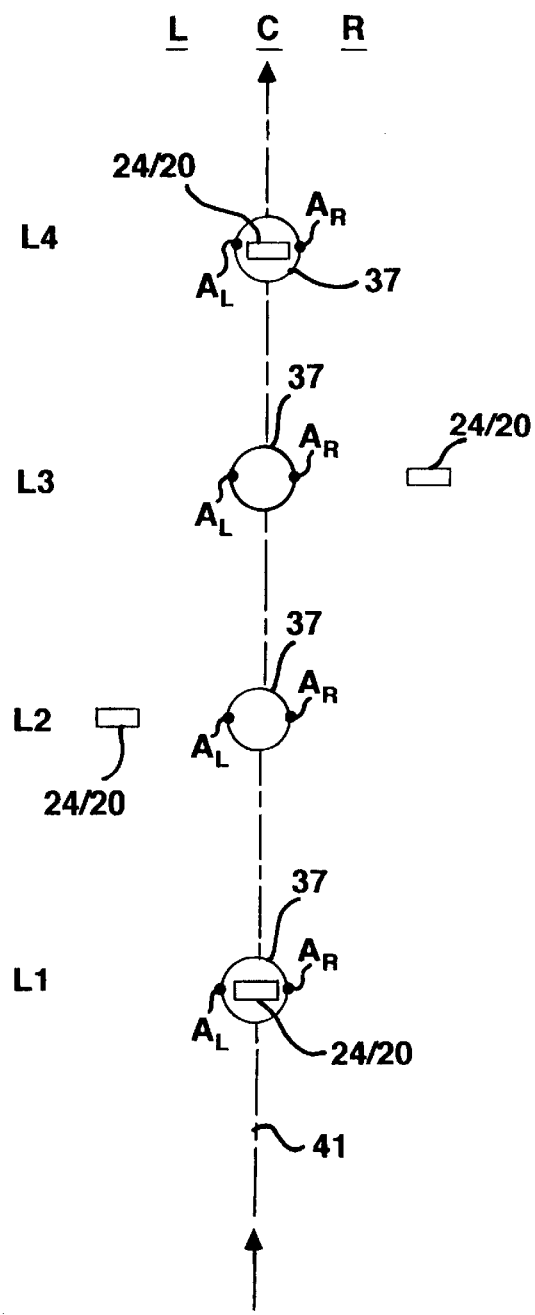
FIG. 17a is a depiction of an underground boring tool tracking methodology using an array of two receive antennas and a transmit antenna provided within the receive antenna array.
Figure 17B:
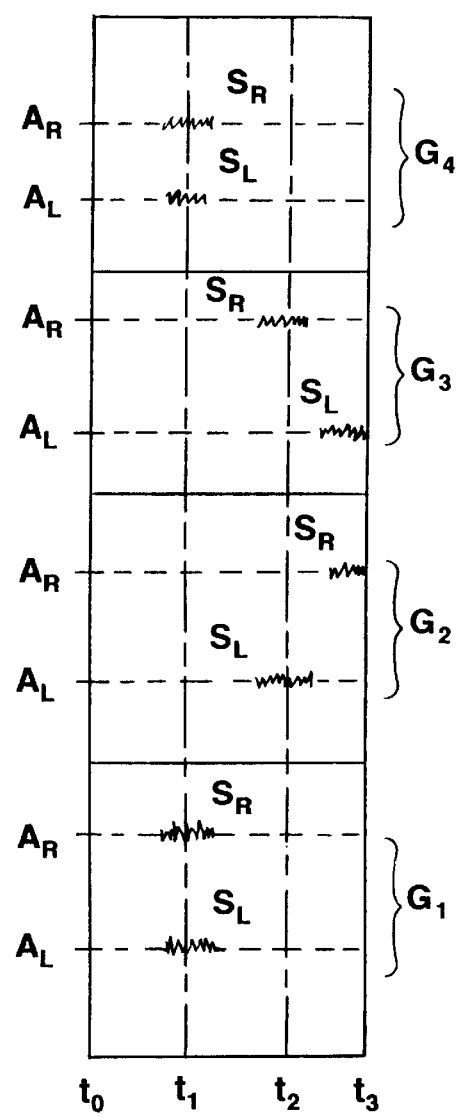
FIG. 17b is a graph illustrating signature signal detection by each of the antennae in the receive antenna array of FIG. 17a which, in turn, is used to determine a location and deviation of an underground boring tool relative to a pre-determined above-ground path.

FIGS. 17a and 17b illustrate one embodiment of a detection methodology employing an antenna array 37 coupled to the PDU 28. The antenna array 37 includes a left receive antenna $A_L$ and a right receive antenna $A_R$ which are respectively positioned on either side of a transmit antenna (not shown) situated at a mid-point between the two receive antennas $A_L$ and $A_R$. The dashed line 41 shown in FIG. 17a depicts a preferred above-ground path under which a borehole 26 is to be created, or has been created, by a boring tool 24 equipped with a cooperative target 20. At a first location L1, it can be seen that the underground boring tool 24 is located immediately beneath the transmit antenna positioned in the center of the antenna array 37. A probe signal 36 emitted by the transmit antenna at a time $t_0$ is received by the cooperative target 20 in the boring tool 24, which, in turn, produces a signature signal 38 that is received by the left receive antenna $A_L$ and the right receive antenna $A_R$ at approximately the same time, as is illustrated in the graph $G_1$ of FIG. 17b.

Referring to the graph $G_1$ of FIG. 17b, it is assumed that the probe signal 36 produced by the PDU 28 is transmitted at a time $t_0$. Because the two receive antennas $A_L$ and $A_R$ of the antenna array 37 are substantially equidistant relative to the cooperative target 20, the signature signal produced by the cooperative target 20 is received by the two antennas $A_L$ and $A_R$ at substantially the same time, $t_1$, after transmission of the probe signal at time $t_0$. Concurrent reception of the signature signal by the two receive antennas $A_L$ and $A_R$ is depicted in the graph $G_1$ of FIG. 17b as detected signals $S_R$ and $S_L$, respectively, at a time $t_1$.

At a second location L2 along the preferred or predetermined above-ground path 41, it can be seen that the boring tool 24 has deviated in a direction left (L) of the center (C) of the predetermined path 41. This deviation of the boring tool 24 is detected by the PDU 28 as a time delay between a time the signature signal 38 is received by the left and right receive antennas $A_L$ and $A_R$, respectively. This time delay results from a difference in the separation distance between the boring tool 24 with respect to the left and right receive antennas $A_L$ and $A_R$. It can be seen that the separation distance between the left receive antenna $A_L$ and the boring tool 24 is less than the separation distance between the right receive antenna $A_R$ and the boring tool 24. The boring tool deviation from the center of path 41 is reflected in the graph $G_2$ of FIG. 17b as a delay between reception of the signature signal $S_L$ by the left receive antenna $A_L$ at a time $t_2$ and reception of the signature signal $S_R$ by the right receive antenna $A_R$ at a later time $t_3$.

At a third location L3 further along the preferred path 41, it can be seen that the boring tool 24 has deviated to the right (R) of the center (C) of the preferred path 41. Such a deviation may result from overcompensation when effecting a course change from a left-of-center location, such as from the second location L2. The right-of-center drift of the boring tool 24 is detected by the PDU 28 as the relative time delay between signature signal reception by the left and right receive antennas $A_L$ and $A_R$, respectively. At the location L3, it can be seen that the distance between the boring tool 24 and the right receive antenna $A_R$ is less than the distance between the boring tool 24 and the left receive antenna $A_L$. Accordingly, as is indicated in the graph $G_3$ of FIG. 17b, the signature signal $S_R$ is received by the right receive antenna $A_R$ in advance of the signature signal $S_L$ received by the left receive antenna $A_L$, thereby resulting in a time delay defined as $\Delta(t_3-t_2)$. This relative time delay may be used to determine the magnitude of boring tool deviation from the predetermined path 41.

At a fourth location L4 along the predefined-above-ground path 41, it can be seen that the boring tool 24 has been directed to the desired center point location along the path 41 after having deviated to the right of the path center point at the previously discussed location L3. As is shown at location L4, the boring tool 24 is again orientated immediately below the center point of the antenna array 37. The signature signal 38 produced by the cooperative target 20 in response to a probe signal 36 emitted from the transmit antenna situated within the antenna array 37 is received substantially concurrently by the left and right receive antennas $A_L$ and $A_R$. The graph $G_4$ of FIG. 17b demonstrates that the boring tool 24 is once again progressing as desired along the center line of the predetermined path 41, as evidenced by contemporaneous reception of the signature signal 38 by the left and right receive antennas $A_L$ and $A_R$, respectively. It is noted that the depth of the boring tool, d, may be determined by any of the approaches discussed herein above. In addition, orientation of the boring tool 20 may also be detected and determined in a manner previously discussed above.

Figures 18A, 18B:
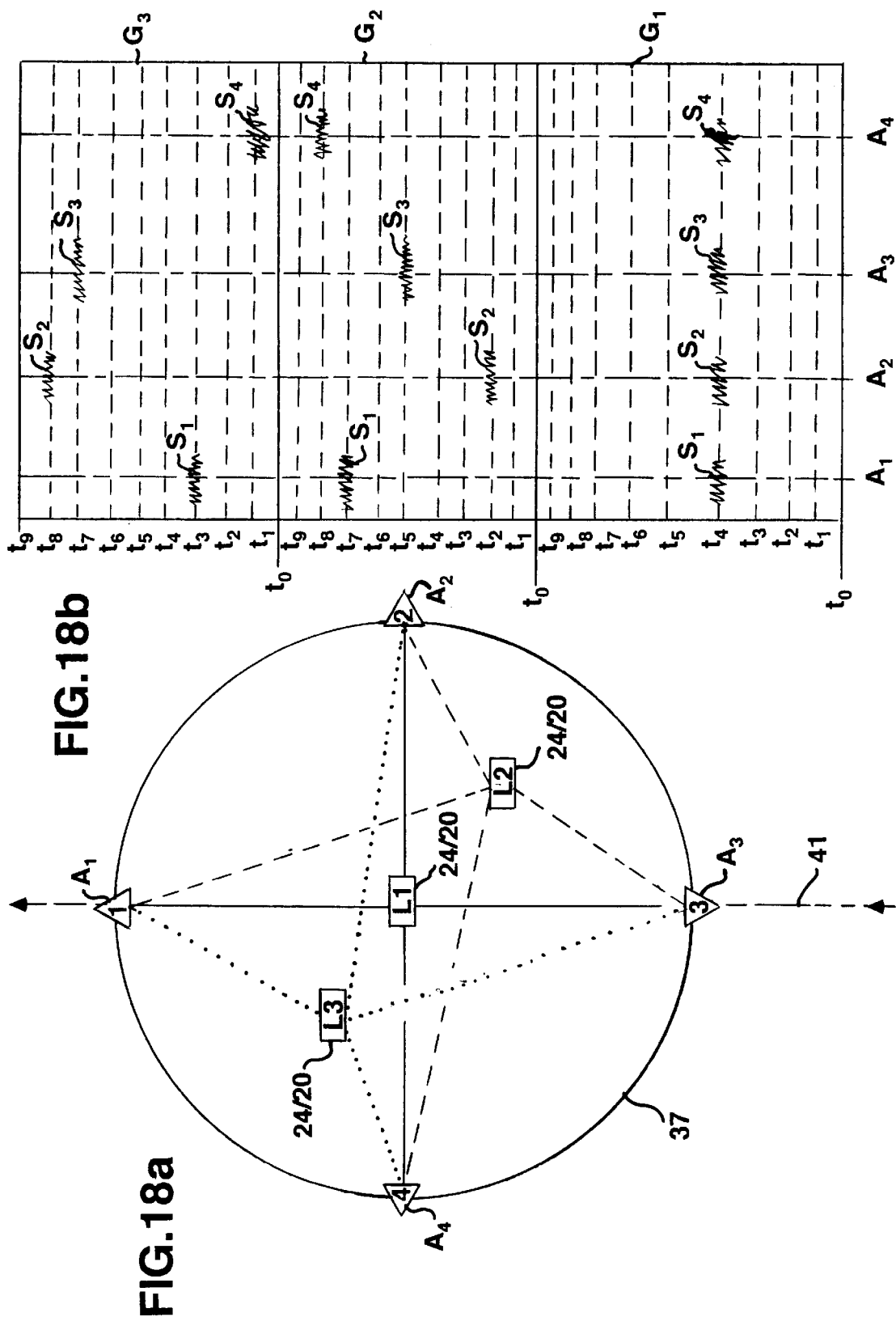
FIG. 18a is a depiction of an underground boring tool tracking methodology using an array of four receive antennas and a transmit antenna provided within the receive antenna array.
FIG. 18b is a graph illustrating signature signal detection by each of the four antennae in the receive antenna array of FIG. 18a which, in turn, is used to determine a location and deviation of an underground boring tool relative to a pre-determined above-ground path.

FIGS. 18a–18b illustrate another embodiment of an antenna array configuration which may be employed in combination with the PDU 28 to accurately track the progress of the underground boring tool 24 along an underground path. With reference to FIG. 18a, an antenna array 37 includes four receive antennas $A_1$, $A_2$, $A_3$, and $A_4$. The antenna array 37 also includes a transmit antenna (not shown) situated at a location within the array 37, typically at a center location. In accordance with this embodiment, the four receive antennas are distributed about the circular array 37 at 0°, 90°, 180°, and 270° positions, respectively. It is to be understood that the configuration of the antenna array 37 need not be circular as is illustrated in the figures, but may instead be arranged in any suitable geometric configuration. Also, the distribution of receive antennas about the antenna array may be different from that illustrated in the figures.

FIG. 18a is a depiction of the antenna array 37 having its center transmit antenna orientated co-parallel with a predetermined above-ground path 41. Superimposed in FIG. 18a is an underground boring tool 24 equipped with a cooperative target 20 depicted at three different locations L1, L2, and L3 along the predetermined path 41. At the location L1, it can be seen that the boring tool 24 is properly aligned co-parallel with the preferred path 41. The signature signal produced by the cooperative target 20, in response to a probe signal produced by the transmit antenna at a time $t_0$, is received at substantially the same time, $t_4$, by each of the four receive antennas $A_1$, $A_2$, $A_3$, and $A_4$. The in-phase relationship of the signature signals $S_1$, $S_2$, $S_3$, and $S_4$ respectively received by receive antennas $A_1$, $A_2$, $A_3$ and $A_4$ is depicted in the graph $G_1$ of FIG. 18b.

At a location L2, it can be seen that the boring tool 24 has deviated right-of-center with respect to the path 41. This course deviation taken by the boring tool 24 is detected by the PDU 28 as an out-of-phase signature signal response within the antenna array 37. The right-of-center deviation is demonstrated in the graph $G_2$ of FIG. 18b by the signature signal reception relationship associated with each of the four receive antennas $A_1$, $A_2$, $A_3$, and $A_4$. It can be seen that the distance between the boring tool 24 at location L2 and the receive antenna $A_2$ is less than the distance between the boring tool 24 and the other receive antennas $A_1$, $A_3$, and $A_4$. As is depicted in the graph $G_2$ of FIG. 18b, the signature signal $S_2$ is received at a time $t_2$ by the receive antenna $A_2$ earlier than the reception times associated with the other receive antennas. By way of further example, the relative distances between the cooperative target 24 and the receive antennas $A_1$ and $A_4$ at the previous location L1 have effectively increased when the boring tool 24 deviates to the location L2, thereby increasing the delay time of signature signal reception by receive antennas $A_1$ and $A_4$. As such, reception of the signature signal $S_1$ by antenna $A_1$ at a time $t_7$ and the signature signal $S_4$ by receive antenna $A_4$ at a time $t_8$ is delayed with respect to the reception of signature signal received by receive antennas $A_2$ and $A_3$ at times $t_2$ and $t_5$ respectively.

At a location L3, the graph $G_3$ of FIG. 18b demonstrates that the boring tool 24 has deviated to a left-of-center position relative to the path 41. The magnitude of the relative time delay within the antenna array 37 indicates the magnitude of off-of-center boring tool deviations as is illustrated by the signature signal response graph of FIG. 18b. It is noted that the boring tool 24 may deviate beyond the periphery of the antenna array 37. Such a deviation will result in a more pronounced reduction in the signal-to-noise ratio with respect to receive antennas situated furthest away from the boring tool location. It is understood that an increase in the number of receive antennas within the antenna array 37 provides for a concomitant increase in boring tool detection resolution. It is believed that an antenna array 37 having a diameter ranging between approximately 2 feet and 5 feet is sufficient for detecting the location of the boring tool 24 at depths of approximately 10 to 15 feet or less.

Figure 19:
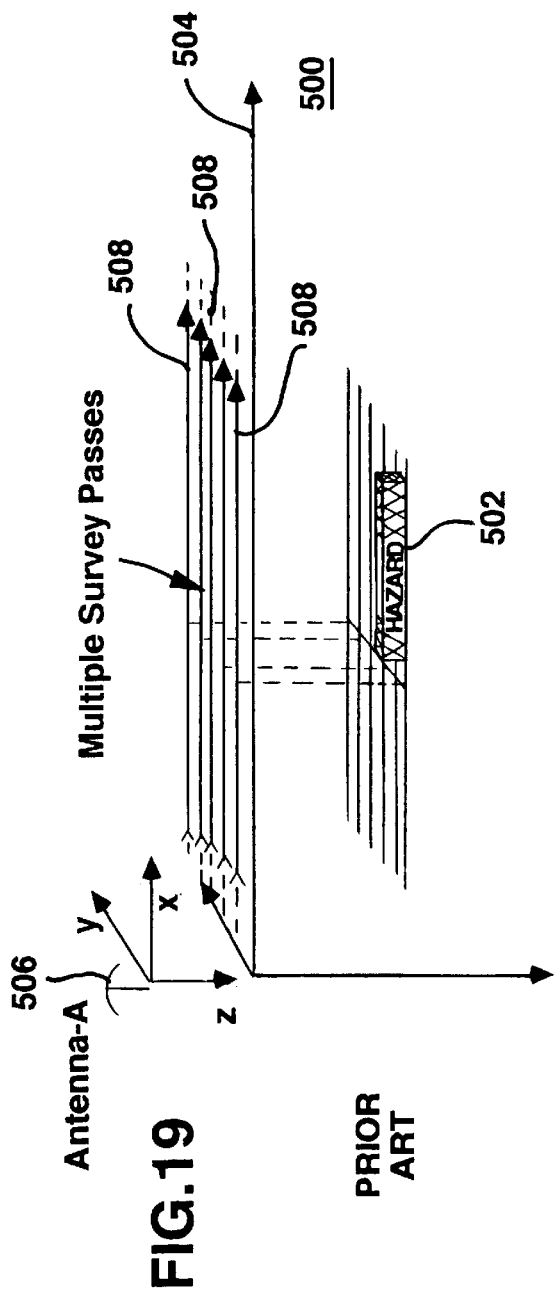
FIG. 19 is an illustration of a single-axis antenna system typically used with a ground penetrating radar system for providing two-dimensional subsurface geologic imaging.

In order to obtain three-dimensional data, a GPR system employing single-axis antenna must make several traverses over the section of ground or must use multiple antennae. The following describes the formation of two and three dimensional images in accordance with another embodiment of an antenna configuration used in combination with the PDU 28. In FIG. 19, there is shown a section of ground 500 for which a PDU 28, typically including a GPR forms an image, with a buried hazard 502 located in the section of ground 500. The ground surface 504 lies in the x-y plane formed by axes x and y, while the z-axis is directed vertically into the ground 500. Generally, a single-axis antenna, such as the one illustrated as antenna-A 506 and oriented along the z-axis, is employed to perform multiple survey passes 508. The multiple survey passes 508 are straight line passes running parallel to each other and have uniform spacing in the y direction. The multiple passes shown in FIG. 19 run parallel to the x-axis.

Generally, as discussed previously, a GPR system has a time measurement capability which allows measuring of the time for a signal to travel from the transmitter, reflect off of a target, and return to the receiver. After the time function capability of the GPR system provides the operator with depth information, the radar system is moved laterally in a horizontal direction parallel to the x-axis, thus allowing for the construction of a two-dimensional profile of a subsurface. By performing multiple survey passes 508 in a parallel pattern over a particular site, a series of two-dimensional images can be accumulated to produce an estimated three-dimensional view of the site within which a buried hazard may be located. It can be appreciated, however, that the two-dimensional imaging capability of a conventional antenna configuration 506 may result in missing a buried hazard, particularly when the hazard 502 is parallel to the direction of the multiple survey passes 508 and lies in between adjacent survey passes 508.

Figure 20:
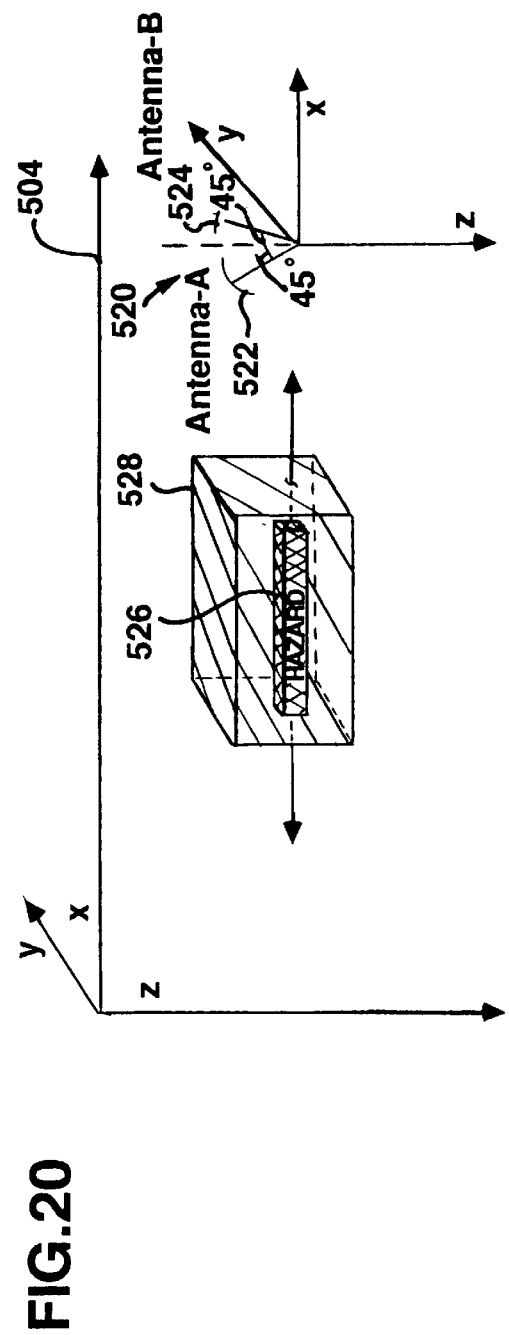
FIG. 20 is an illustration of an antenna system including a plurality of antennae oriented in an orthogonal relationship for use with a ground penetrating radar system to provide three-dimensional subsurface geologic imaging in accordance with one embodiment of the invention.

A significant advantage of a geologic imaging antenna configuration 520 of the present invention provides for true three-dimensional imaging of a subsurface as shown in FIG. 20. A pair of antennae, antenna-A 522 and antenna-B 524, are preferably employed in an orthogonal configuration to provide for three-dimensional imaging of a buried hazard 526. Antenna-A 522 is shown as directed along a direction contained within the y-z axis and at +45° relative to the z-axis. Antenna-B 524 is also directed along a direction contained within the y-z plane, but at −45° relative to the z-axis, in a position rotated 90° from that of antenna-A 522. It is noted that the hyperbolic time-position data distribution typically obtained by use of a conventional single-axis antenna, may instead be plotted as a three-dimensional hyperbolic shape that provides width, depth, and length dimensions of a detected buried hazard 526. It is further noted that a buried hazard 526, such as a drainage pipeline, which runs parallel to the survey path 528 will readily be detected by the three-dimensional imaging GPR system. Respective pairs of orthogonally oriented transmitting and receive antennae may be employed in the transmitter 54 and receiver 56 of the PDU 28 in accordance with one embodiment of the invention.

Additional features can be included on the boring tool 24. It may be desired, under certain circumstances, to make certain measurements of the boring tool 24 orientation, shear stresses on the drill string 22, and the temperature of the boring tool 24, for example, in order to more clearly understand the conditions of the boring operation. Additionally, measurement of the water pressure at the boring tool 24 may provide an indirect measurement of the depth of the boring tool 24 as previously described hereinabove.

Figure 21C:
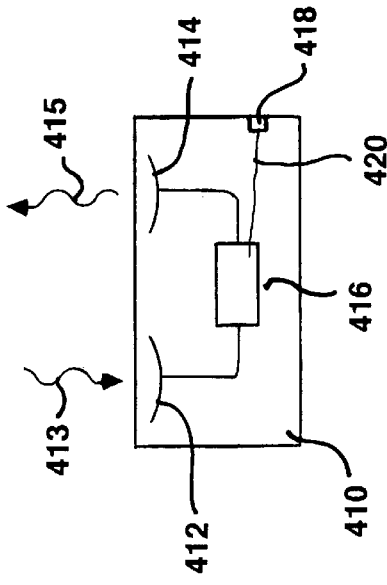

FIG. 21c illustrates an embodiment which allows sensors to sense the environment of the boring tool 410. The figure shows an active time domain signature signal generation circuit which includes a receive antenna 412 connected to a transmit antenna 414 through an active time domain circuit 416. A sensor 418 is connected to the active time domain circuit 416 via a sensor lead 420. In this embodiment, the sensor 418 is placed at the tip of the boring tool 410 for measuring the pressure of water at the boring tool 410. The reading from the sensor 418 is detected by the active time domain circuit 416 which converts the reading into a modulation signal. The modulation signal is subsequently used to modulate the actively generated signature signal 415. This process is described with reference to FIG. 21d, which shows several signals as a function of time. The top signal 413d represents the probe signal, $I_p$, received by the receive antenna 412. The second signal, 415d, represents the actively generated signature signal $I_a$, which would be generated if there were no modulation of the signature signal. The third trace, 416d, shows the amplitude modulation signal, $I_m$, generated by the active time domain circuit 416, and the last trace, 422d, shows the signature signal, $I_s$, after amplitude modulation. The modulated signature signal 415 is detected by the PDU 28. Subsequent determination of the modulation signal by the signal processor 60 in the PDU 28 provides data regarding the output from the sensor 418.

Modulation of the signature signal is not restricted to the combination of amplitude modulation of a time domain signal as shown in the embodiment of FIG. 21. This combination was supplied for Illustrative purposes only. It is understood that other embodiments include amplitude modulation of frequency domain signature signals, and frequency modulation of both time and frequency domain signature signals. In addition, the boring tool 24 may include two or more sensors rather than the single sensor as illustrated in the above embodiment.

Figure 22A:
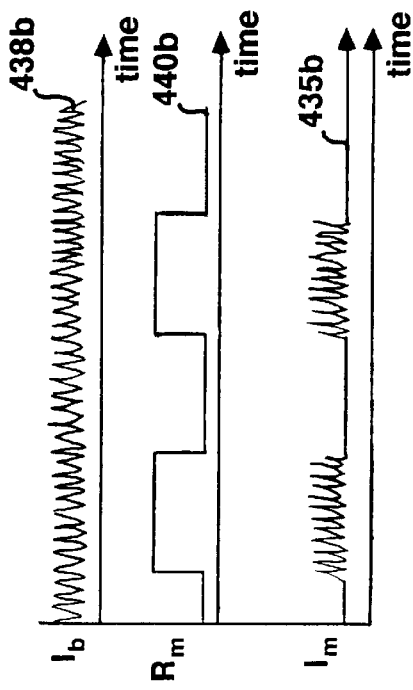
FIGS. 22a–d illustrate an embodiment of a trenchless underground boring tool incorporating an active beacon and various sensors, and further depicts sensor signal information.

FIG. 22a illustrates another embodiment of the invention in which a separate active beacon is employed for transmitting information on the orientation or the environment of the boring tool 430 to the PDU 28. In this embodiment, shown in FIG. 22a, the boring tool 430 includes a passive time domain signature circuit employing a single antenna 432, a time delay line 434, and an open termination 436 for reflecting the electrical signal. The single antenna 432 is used to receive a probe signal 433 and transmit a signature/beacon signal 435. An active beacon circuit 438 generates a beacon signal, preferably having a selected frequency in the range of 50 KHz to 500 MHz, which is mixed with the signature signal generated by the termination 436 and transmitted from the antenna 432 as the composite signature/beacon signal 435. A mercury switch 440 is positioned between the active beacon circuit 438 and the antenna 432 so that the mercury switch 440 operates only on the signal from the active beacon circuit 438 and not on the signature signal generated by the termination 436.

Figure 22B:
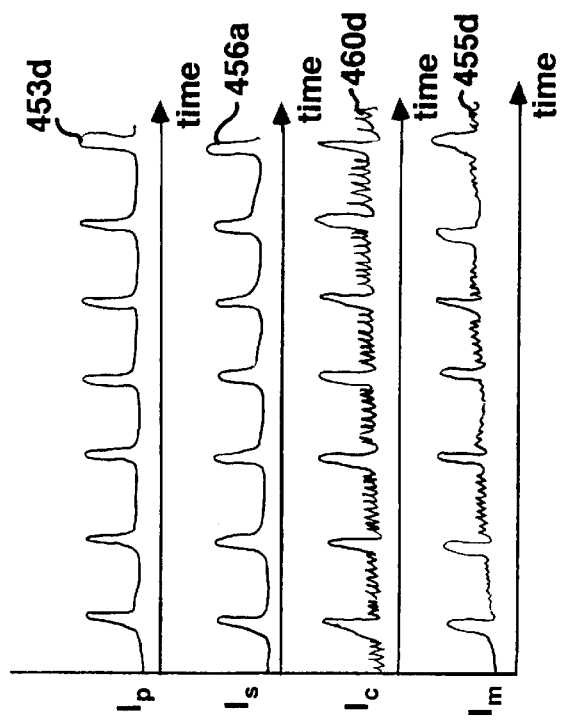

When the boring tool 430 is oriented so that the mercury switch 440 is open, the beacon signal circuit 438 is disconnected from the antenna 432, and no signal is transmitted from the active beacon circuit 438. When the boring tool 430 is oriented so that the mercury switch 440 is closed, the active beacon circuit 438 is connected to the antenna 432 and the signal from the active beacon circuit 438 is transmitted along with the signature signal as the signature/beacon signal 435. The effect of the mercury switch on the signature/beacon signal 435 has been described previously with respect to FIG. 21b. The top trace 438b, in FIG. 22b, shows the signal, $I_b$, generated by the active beacon circuit 438 as a function of time. As the boring tool 430 rotates and moves along an underground path, the resistance, Rm, of the mercury switch 440 alternates from low to high values, as shown in the center trace 440b. The continual opening and closing of the mercury switch 440 produces a modulated signature/beacon signal 435b, $I_m$, which is received at the surface by the PDU 28. Only a beacon signal component, and no signature signal component, is shown in signal $I_m$ 435b. The modulation of signal $I_m$ 435b maintains a constant phase relative to a preferred orientation of the boring tool 430. Analysis of the modulation of the beacon signal by a beacon receiver/analyzer 61 on the PDU 28 allows the operator to determine the orientation of the boring tool head.

Figure 22C:
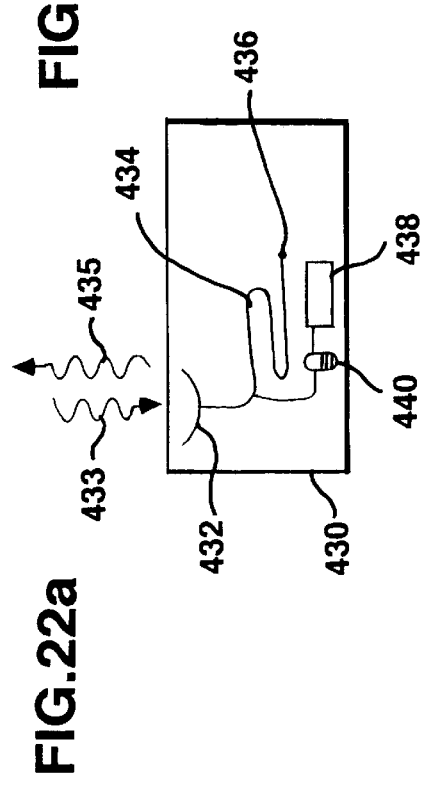

FIG. 22c illustrates an embodiment which allows sensors to sense the environment of the boring tool 450 where an active beacon is used to transmit sensor data. The figure shows an active time domain signature signal generation circuit including a receive antenna 452, a transmit antenna 454, and an active time domain signature signal circuit 456, all of which are connected via a time delay line 457. An active beacon circuit 460 is also connected to the transmit antenna 454. A sensor 458 is connected to the active beacon circuit 460 via a sensor lead 462. In this embodiment, the sensor 458 is placed near the tip of the boring tool 450 and is used to measure the pressure of water at the boring tool 450. The sensor reading is detected by the active beacon circuit 460 which converts the signal from the sensor 458 into a modulation signal. The modulation signal is subsequently used to modulate an active beacon signal generated by the active beacon circuit 460.

Figure 22D:
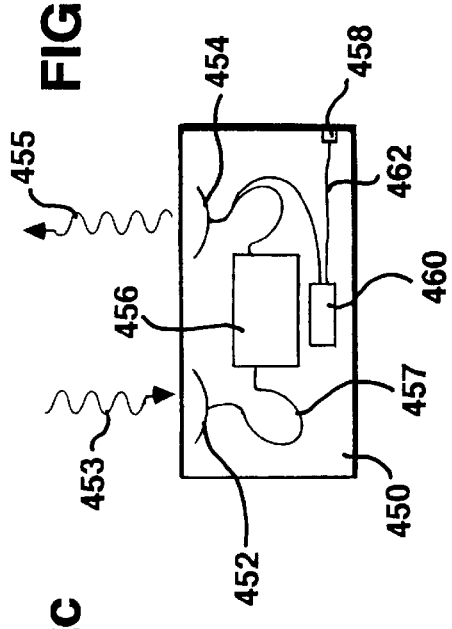

To illustrate the generation of the signature/beacon signal 455 transmitted to the PDU 28, several signals are illustrated as a function of time in FIG. 22d. The signal 453d represents the probe signal, $I_p$, received by the receive antenna 452. The second signal 456d represents the time-delayed signature signal, $I_s$, generated by the active time domain circuit 456. The third signal 460d, $I_c$, represents a combination of the time-delayed signature signal $I_s$ 456d and an unmodulated signal produced by the active beacon circuit 460. The last trace, 455d, shows a signal received at the surface, $I_m$, which is a combination of the time-delayed signature signal $I_s$ 456d and a signal produced by the active beacon circuit 460 which has been modulated in accordance with the reading from the sensor 458. Detection of the modulated active beacon signal by the beacon signal detector 61 in the PDU 28, followed by appropriate analysis, provides data to the user regarding the output from the sensor 458.

In FIG. 23, there is illustrated an embodiment for using a detection system to locate an underground boring tool and to characterize the intervening medium between the boring head and the PDU 28. In this figure, there is illustrated a trenchless underground boring system 12 situated on the surface 11 of the ground 10 in an area in which the boring operation is to take place. A control unit 32 is located near the trenchless underground boring system 12. In accordance with this illustrative example, a boring operation is taking place under a roadway. The ground 10 is made up of several different ground types, the examples as shown in FIG. 23 being sand (ground type (GT2)) 140, clay (GT3) 142 and native soil (GT4) 144. The road is generally described by the portion denoted as road fill (GT1) 146. FIG. 12 illustrates a drill string 22 in a first position 22c, at the end of which is located a boring tool 24c. The PDU 28c is shown as being situated at a location above the boring tool 24c. The PDU 28c transmits a probe signal 36c which propagates through the road fill and the ground.

In the case of the boring tool at location 24c, the probe signal 36c propagates through the road fill 146 and the clay 142. The boring tool 24c, in response, produces a signature signal 38c which is detected and analyzed by the PDU 28c. The analysis of the signature signal 38c provides a measure of the time-of-flight of the probe signal 36c and the signature signal 38c. The time-of-flight is defined as a time duration measured by the PDU 28c between sending the probe signal 36c and receiving the signature signal 38c. The time-of-flight measured depends on a number of factors including the depth of the boring tool 24c, the dielectric conditions of the intervening ground medium 146 and 142, and any delay involved in the generation of the signature signal 38c. Knowledge of any two of these factors will yield the third from the time-of-flight measurement.

The depth of the boring tool 24c can be measured independently using a mechanical probe or sensing the pressure of the water at the boring tool 24c using a sensor 130 located in the boring tool head 24c as discussed hereinabove. For the latter measurement, the boring operation is halted, and the water pressure measured. Since the height of the water column in the drill string 22 above the ground is known, the depth of the boring tool 24c can be calculated using known techniques. For an embodiment of the invention which uses a microwave probe signal, a general relationship for calculating the depth or dielectric constant from the time of flight measurement is given by Equation [8] discussed previously hereinabove.

For the case where the boring tool is located at position 24c as shown in FIG. 23, and with the assumption that the road fill has a negligible thickness relative to the thickness of clay, the relationship of Equation [8] simplifies to:

$$TE = TF - TD = \sum \frac{d_3 \sqrt{\varepsilon_3}}{c} \quad [9]$$

where, the subscript "3" refers to GT3. Direct measurement of the time-of-flight, TF, and the depth of the boring tool 24c, $d_3$, along with the knowledge of any time delay, TD, will yield the average dielectric constant, $\varepsilon_3$, of GT3. This characteristic can be denoted as GC3.

Returning to FIG. 23, there is illustrated an embodiment in which the boring tool 24 has been moved from its first location 24c to another position 24d. The drill string 22d (shown in dashed lines) has been extended from its previous configuration 22c by the addition of extra drill string members in a manner as described previously hereinabove. The PDU 28 has been relocated from its previous position 28c to a new position 28d (shown in dashed lines) in order to be close to the boring tool 24d. The parameter GC4, which represents the ground characteristic of the native soil GT4, can be obtained by performing time-of-flight measurements as previously described using the probe signal 36d and signature signal 38d. Likewise, ground characteristic GC2 can be obtained from time-of-flight measurements made at the point indicated by the letter "e". The continuous derivation of the ground characteristics as the boring tool 24d travels through the ground results in the production of a ground characteristic profile which may be recorded by the control unit 32. The characteristics of the intervening ground medium between the PDU 28 and the cooperative target 20 may be determined in manner described herein and in U.S. Pat. No. 5,553,407, which is assigned to the assignee of the instant application, the contents of which are incorporated herein by reference.

It may be advantageous to make a precise recording of the underground path traveled by the boring tool 24. For example, it may be desirable to make a precise record of where utilities have been buried in order to properly plan future excavations or utility burial and to avoid unintentional disruption of such utilities. Borehole mapping can be performed manually by relating the boring tool position data collected by the PDU 28 to a base reference point, or may be performed electronically using a Geographic Recording System (GRS) 150 shown generally as a component of the control unit 32 in FIG. 24. In one embodiment, a Geographic Recording System (GRS) 150 communicates with a central processor 152 of the control unit 32, relaying the precise location of the PDU 28. Since the control unit 32 also receives information regarding the position of the boring tool 24 relative to the PDU 28, the precise location of the boring tool 24 can be calculated and stored in a route recording database 154.

In accordance with another embodiment, the geographic position data associated with a predetermined underground boring route is acquired prior to the boring operation. The predetermined route is calculated from a survey performed prior to the boring operation. The prior survey includes GPR sensing and geophysical data in order to estimate the type of ground through which the boring operation will take place, and to determine whether any other utilities or buried hazards are located on a proposed boring pathway. The result of the pre-bore survey is a predetermined route data set which is stored in a planned route database 156. The predetermined route data set is uploaded from the planned route database 156 into the control unit 32 during the boring operation to provide autopilot-like directional control of the boring tool 24 as it cuts its underground path. In yet another embodiment, the position data acquired by the GRS 150 is preferably communicated to a route mapping database 158 which adds the boring pathway data to an existing database while the boring operation takes place. The route mapping database 158 covers a given boring site, such as a grid of city streets or a golf course under which various utility, communication, plumbing and other conduits may be buried. The data stored in the route mapping database 158 may be subsequently used to produce a survey map that accurately specifies the location and depth of various utility conduits buried in a specific site. The data stored in the route mapping database 158 also includes information on boring conditions, ground characteristics, and prior boring operation productivity, so that reference may be made by the operator to all prior boring operational data associated with a specific site.

An important feature of the novel system for locating the boring tool 24 concerns the acquisition and use of geophysical data along the boring path. A logically separate Geophysical Data Acquisition Unit 160 (GDAU), which may or may not be physically separate from the PDU 28, may provide for independent geophysical surveying and analysis. The GDAU 160 preferably includes a number of geophysical instruments which provide a physical characterization of the geology for a particular boring site. A seismic mapping module 162 includes an electronic device consisting of multiple geophysical pressure sensors. A network of these sensors is arranged in a specific orientation with respect to the trenchless underground boring system 12, with each sensor being situated so as to make direct contact with the ground. The network of sensors measures ground pressure waves produced by the boring tool 24 or some other acoustic source. Analysis of ground pressure waves received by the network of sensors provides a basis for determining the physical characteristics of the subsurface at the boring site and also for locating the boring tool 24. These data are processed by the GDAU 160 prior to sending analyzed data to the central processor 152.

A point load tester 164 may be employed to determine the geophysical characteristics of the subsurface at the boring site. The point load tester 164 employs a plurality of conical bits for the loading points which, in turn, are brought into contact with the ground to test the degree to which a particular subsurface can resist a calibrated level of loading. The data acquired by the point load tester 164 provide information corresponding to the geophysical mechanics of the soil under test. These data may also be transmitted to the GDAU 160.

The GDAU 160 may also include a Schmidt hammer 166 which is a geophysical instrument that measures the rebound hardness characteristics of a sampled subsurface geology. Other geophysical instruments may also be employed to measure the relative energy absorption characteristics of a rock mass, abrasivity, rock volume, rock quality, and other physical characteristics that together provide information regarding the relative difficulty associated with boring through a given geology. The data acquired by the Schmidt hammer 166 are also stored in the GDAU 160.

In the embodiment illustrated in FIG. 24, a Global Positioning System (GPS) 170 is employed to provide position data for the GRS 150. In accordance with a U.S. Government project to deploy twenty-four communication satellites in three sets of orbits, termed the Global Positioning System (GPS), various signals transmitted from one or more GPS satellites may be used indirectly for purposes of determining positional displacement of a boring tool 24 relative to one or more known reference locations. It is generally understood that the U.S. Government GPS satellite system provides for a reserved, or protected, band and a civilian band. Generally, the protected band provides for high-precision positioning to a classified accuracy. The protected band, however, is generally reserved exclusively for military and other government purposes, and is modulated in such a manner as to render it virtually useless for civilian applications. The civilian band is modulated so as to significantly reduce the accuracy available, typically to the range of one hundred to three hundred feet.

The civilian GPS band, however, can be used indirectly in relatively high-accuracy applications by using one or more GPS signals in combination with one or more ground-based reference signal sources. By employing various known signal processing techniques, generally referred to as differential global positioning system (DGPS) signal processing techniques, positional accuracies on the order of centimeters are now achievable. As shown in FIG. 24, the GRS 150 uses the signal produced by at least one GPS satellite 172 in cooperation with signals produced by at least two base transponders 174, although the use of one base transponder 174 may be satisfactory in some applications. Various known methods for exploiting DGPS signals using one or more base transponders 174 together with a GPS satellite 172 signal and a mobile GPS receiver 176 coupled to the control unit 32 may be employed to accurately resolve the boring tool 24 movement relative to the base transponder 174 reference locations using a GPS satellite signal source.

In another embodiment, a ground-based positioning system may be employed using a range radar system 180. The range radar system 180 includes a plurality of base radio frequency (RF) transponders 182 and a mobile transponder 184 mounted on the PDU 28. The base transponders 182 emit RF signals which are received by the mobile transponder 184. The mobile transponder 184 includes a computer which calculates the range of the mobile transponder 184 relative to each of the base transponders 182 through various known radar techniques, and then calculates its position relative to all base transponders 182. The position data set gathered by the range radar system 180 is transmitted to the GRS 150 for storing in route recording database 154 or the route mapping system 158.

In yet another embodiment, an ultrasonic positioning system 190 may be employed together with base transponders 192 and a mobile transponder 194 coupled to the PDU 28. The base transponder 192 emits signals having a known clock timebase which are received by the mobile transponder 194. The mobile transponder 194 includes a computer which calculates the range of the mobile transponder 194 relative to each of the base transponders 192 by referencing the clock speed of the source ultrasonic waves. The computer of the mobile transponder 194 also calculates the position of the mobile transponder 194 relative to all of the base transponders 192. It is to be understood that various other known ground-based and satellite-based positioning systems and techniques may be employed to accurately determine the path of the boring tool 24 along an underground path.

Figure 25:
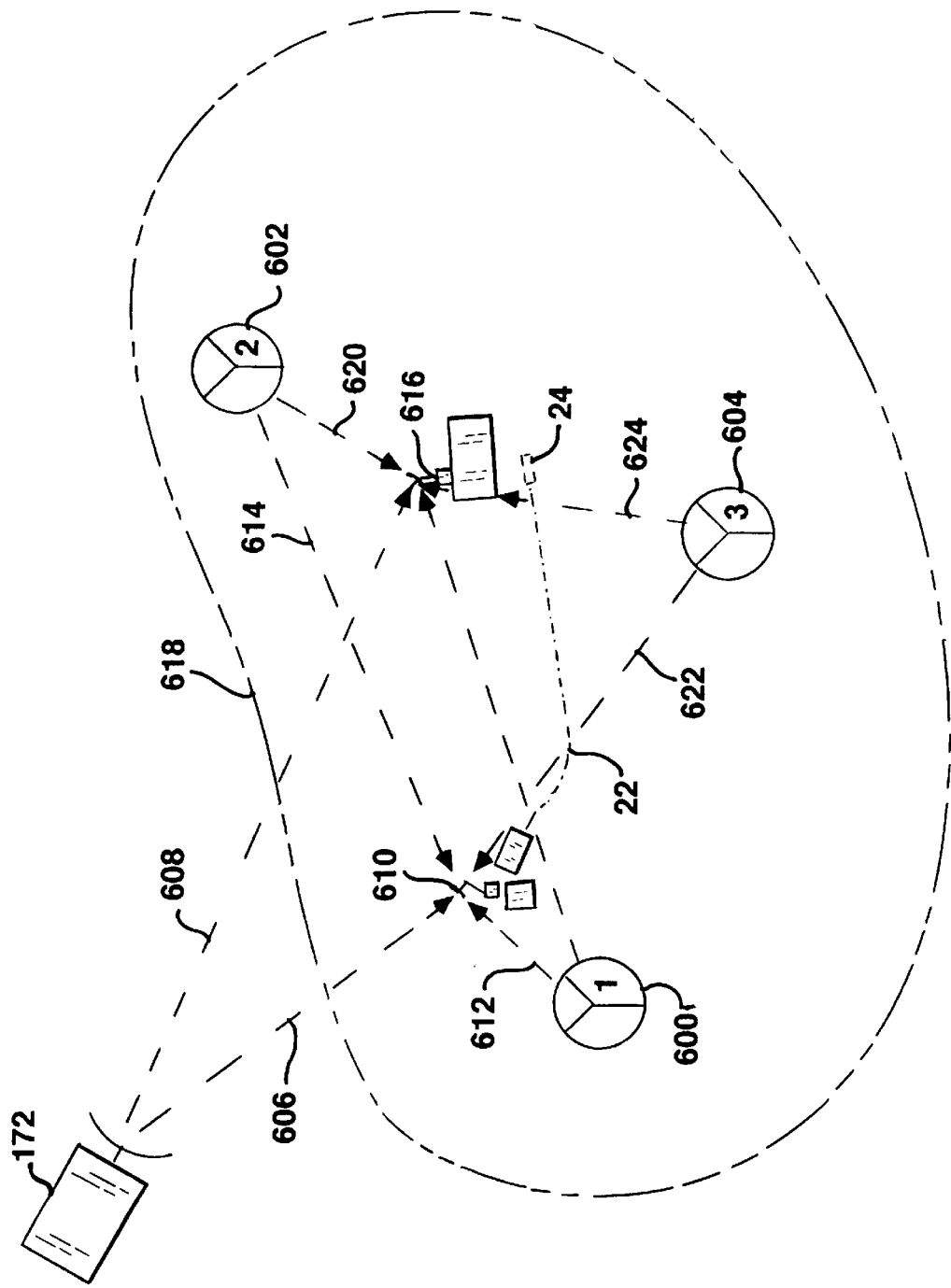
FIG. 25 is an illustration of a boring site and a trenchless boring system incorporating position location devices.

FIG. 25 illustrates an underground boring tool 24 performing a boring operation along an underground path at a boring site. An important advantage of the novel geographic positioning unit 150, generally illustrated in FIG. 25, concerns the ability to accurately navigate the boring tool 24 along a predetermined boring route and to accurately map the underground boring path in a route mapping database 158 coupled to the control unit 32. It may be desirable to perform an initial survey of the proposed boring site prior to commencement of the boring operation for the purpose of accurately determining a boring route which avoids difficulties, such as previously buried utilities or other obstacles, including rocks, as is discussed hereinbelow.

As the boring tool 24 progresses along the predetermined boring route, actual positioning data are collected by the geographic recording system 150 and stored in the route mapping database 158. Any intentional deviation from the predetermined route stored in the planned path database 156 is accurately recorded in the route mapping database 158. Unintentional deviations are corrected so as to maintain the boring tool 24 along the predetermined underground path. Upon completion of a boring operation, the data stored in the route mapping database 158 may be downloaded to a personal computer (not shown) to construct an "as is" underground map of the boring site. Accordingly, an accurate map of utility or other conduits installed along the boring route may be constructed from the route mapping data and subsequently referenced by those desiring to gain access to, or avoid, such buried conduits.

Still referring to FIG. 25, accurate mapping of the boring site may be accomplished using a global positioning system 170, range radar system 180 or ultrasonic positioning system 190 as discussed previously with respect to FIG. 24. A mapping system having a GPS system 170 includes first and second base transponders 600 and 602 together with one or more GPS signals 606 and 608 received from GPS satellites 172. A mobile transponder 610, coupled to the control unit 32, is provided for receiving the GPS satellite signal 606 and base transponder signals 612 and 614 respectively transmitted from the transponders 600 and 602 in order to locate the position of the control unit 32. As previously discussed, a modified form of differential GPS positioning techniques may be employed to enhance positioning accuracy to the centimeter range. A second mobile transponder 616, coupled to the PDU 28, is provided for receiving the GPS satellite signal 608 and base transponder signals 618 and 620 respectively transmitted from the transponders 600 and 602 in order to locate the position of the PDU 28.

In another embodiment, a ground-based range radar system 180 includes three base transponders 600, 602, and 604 and mobile transponders 610 and 616 coupled to the control unit 32 and PDU 28, respectively. It is noted that a third ground-based transponder 604 may be provided as a backup transponder for a system employing GPS satellite signals 606 and 608 in cases where GPS satellite signal 606 and 608 transmission is temporarily terminated, either purposefully or unintentionally. Position data for the control unit 32 are processed and stored by the GRS 150 using the three reference signals 612, 614, and 622 received from the ground-based transponders 600, 602, and 604, respectively. Position data for the PDU 28, obtained using the three reference signals 618, 620, and 624 received respectively from the ground-based transponders 600, 602, and 604, are processed and stored by the local position locator 616 coupled to the PDU 28 and then sent to the control unit 32 via a data transmission link 34. An embodiment employing an ultrasonic positioning system 190 would similarly employ three base transponders 600, 602, and 604, together with mobile transponders 610 and 616 coupled to the control unit 32 and PDU 28, respectively.

Figure 26:
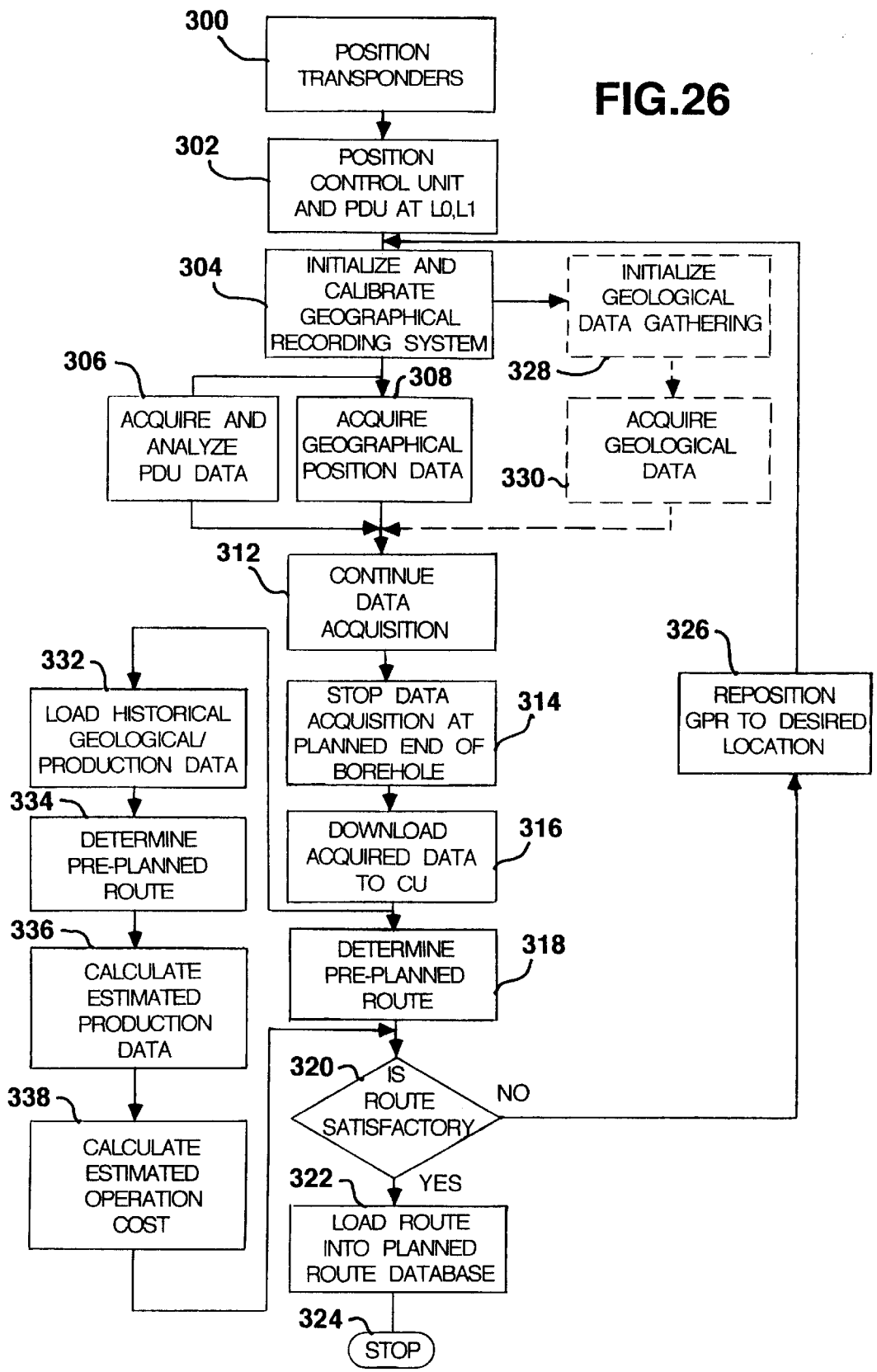
FIG. 26 illustrates in flow diagram form generalized method steps for performing a pre-bore survey.

Referring now to FIG. 26, there is illustrated in flowchart form generalized steps associated with the pre-bore survey process for obtaining a pre-bore site map and determining the optimum route for the boring operation prior to commencing the boring operation. In brief, a pre-bore survey permits examination of the ground through which the boring operation will take place and a determination of an optimum route, an estimate of the productivity, and an estimate of the cost of the entire boring operation.

Initially, as shown in FIG. 26, a number of ground-based transponders are positioned at appropriate locations around the boring site at step 300. The control unit 32 and the PDU 28 are then situated at locations L0 and L1 respectively at step 302. The geographical recording system 150 is then initialized and calibrated at step 304 in order to locate the initial positions of the control unit 32 and PDU 28. After successful initialization and calibration, the PDU 28 is moved along a proposed boring route, during which PDU data and geographical location data are acquired at steps 306 and 308, respectively. The data gathered by the PDU 28 are preferably analyzed at steps 306 and 308. The acquisition of data continues at step 312 until the expected end of the proposed boring route is reached, at which point data accumulation is halted, as indicated at step 314.

The acquired data are then downloaded to the control unit 32, which may be a personal computer, at step 316. The control unit 32, at step 318, then calculates an optimum predetermined path for the boring operation, and does so as to avoid obstacles and other structures. If it is judged that the predetermined route is satisfactory, as is tested at step 320, the route is then loaded into the planned path database 156 at step 322, and the pre-bore survey process is halted at step 324. If, however, it is determined that the planned route is unsatisfactory, as is tested at step 320 because, for example, the survey revealed that the boring tool 24 would hit a rock obstacle or that there were buried utilities which could be damaged during a subsequent boring operation, then the PDU 28 can be repositioned, at step 326, at the beginning of the survey route and a new route surveyed by repeating steps 304–318. After a satisfactory route has been established, the pre-bore survey process is halted at step 324.

In another embodiment, the pre-bore survey process includes the collection of geological data along the survey path, concurrently with position location and PDU data collection. This collection activity is illustrated in FIG. 26 which shows an initialization and calibration step 328 for the geophysical data acquisition unit 160 (GDAU) taking place concurrently with the initialization and calibration of the geographical recording system 150. The GDAU 160 gathers geological data at step 330 at the same time as the PDU 28 and position data are being acquired in steps 306 and 308, respectively. The inclusion of geological data gathering provides for a more complete characterization of the ground medium in the proposed boring pathway, thus allowing for more accurate productivity and cost estimates to be made for the boring operation.

In a third embodiment, the survey data are compared with previously acquired data stored in the route mapping database 158 in order to provide estimates of the boring operation productivity and cost. In this embodiment, historical data from the route mapping database are loaded into the control processor 152 at step 332 after the survey data have been downloaded to the control unit 32 in step 316. The data downloaded from the route mapping database 158 include records of prior surveys and boring operations, such as GPR and geological characterization measurements and associated productivity data. The pre-planned route is calculated at step 334 in a manner similar to the calculation of the route indicated at step 318. By correlating the current ground characterization, resulting from the PDU 28 and GDAU 160 data, with prior characterization measurements and making reference to associated prior productivity results, it is possible to estimate, at step 336, productivity data for the planned boring operation. Using the estimated production data of step 336, it is then possible to produce a cost estimate of the boring process at step 338. In the following step 320, a determination is made regarding whether or not the pre-planned route is satisfactory. This determination can be made using not only the subsurface features as in the first embodiment, but can be made using other criteria, such as the estimated duration of the boring process or the estimated cost.

Figure 27:
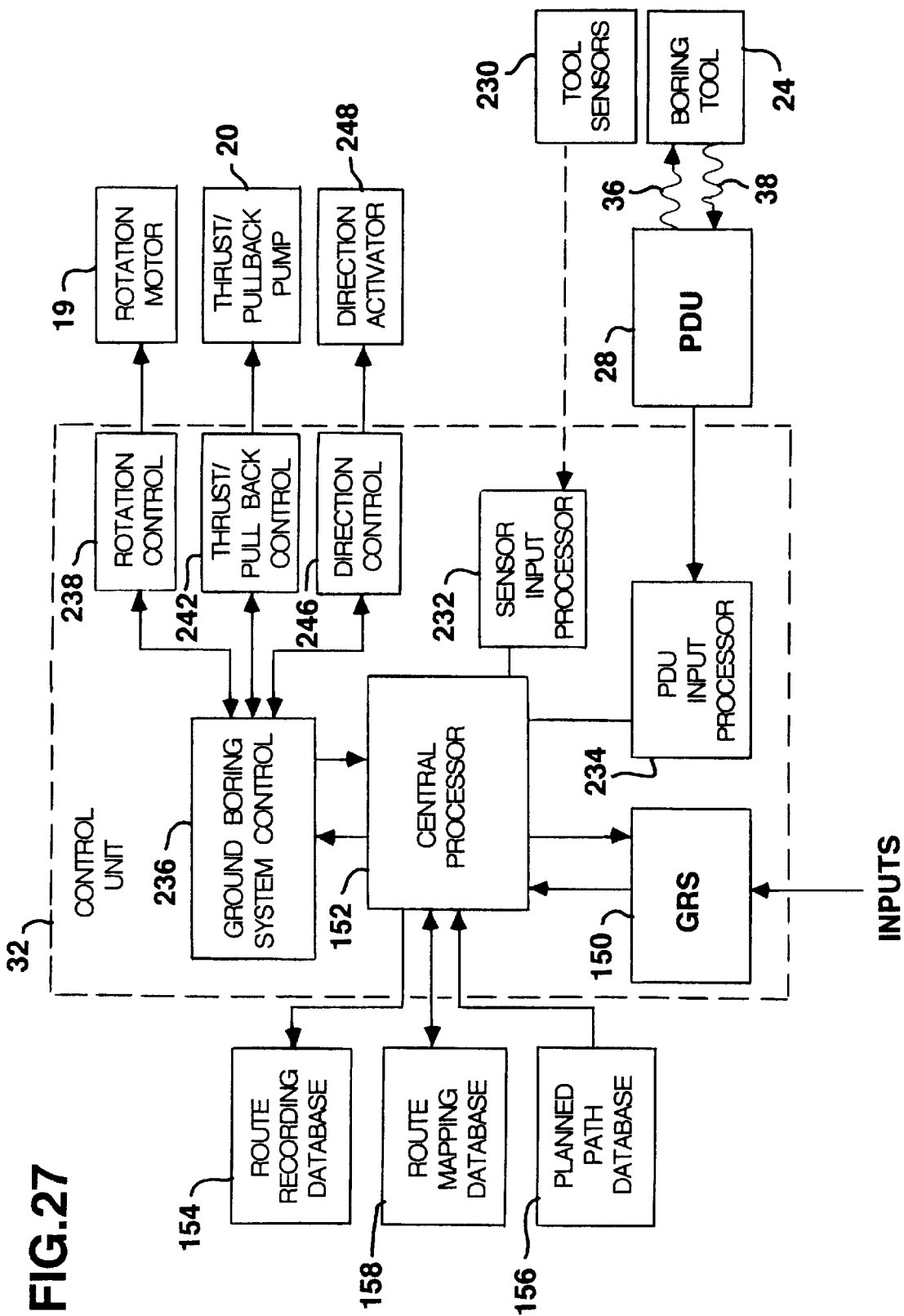
FIG. 27 is a system block diagram of a trenchless underground boring system control unit for controlling the boring operation.

Referring now to FIG. 27, there is illustrated a system block diagram of a control unit 32, its various components, and the functional relationship between the control unit 32 and various other elements of the trenchless underground boring system 12. The control unit 32 includes a central processor 152 which accepts input data from the geographic recording system 150, the PDU 28, and the GDAU 160. The central processor 152 calculates the position of the boring tool 24 from the input data. The control processor 152 records the path taken by the boring tool 24 in the route recording database 154 and/or adds it to the existing data in the route mapping database 158.

In an alternative embodiment, the central processor 152 also receives input data from the sensors 230 located at the boring tool 24 through the sensor input processor 232. In another embodiment, the central processor 152 loads data corresponding to a predetermined path from the planned path database 156 and compares the measured boring tool position with the planned position. The position of the boring tool 24 is calculated by the central processor 152 from data supplied by the PDU input processor 234 which accepts the data received from the PDU 28. In an alternative embodiment, the central processor 152 also employs data on the position of the PDU 28, supplied by the Geographic Recording System 150, in order to produce a more accurate estimate of the boring tool location.

Corrections in the path of the boring tool 24 during a boring operation can be calculated and implemented to return the boring tool 24 to a predetermined position or path. The central processor 152 controls various aspects of the boring tool operation by use of a trenchless ground boring system control (GBSC) 236. The GBSC 236 sends control signals to boring control units which control the movement of the boring tool 24. These boring control units include the rotation control 238, which controls the rotating motor 19 for rotating the drill string 22, the thrust/pullback control 242, which controls the thrust/pullback pump 20 used to drive the drill string 22 longitudinally into the borehole, and the direction control 246, which controls the direction activator mechanism 248 which steers the boring tool 24 in a desired direction. The PDU input processor 234 may also identify buried features, such as utilities, from data produced by the PDU 28. The central processor 152 calculates a path for the boring tool 24 which avoids any possibility of a collision with, and subsequent damage to, such buried features.

Figure 28:
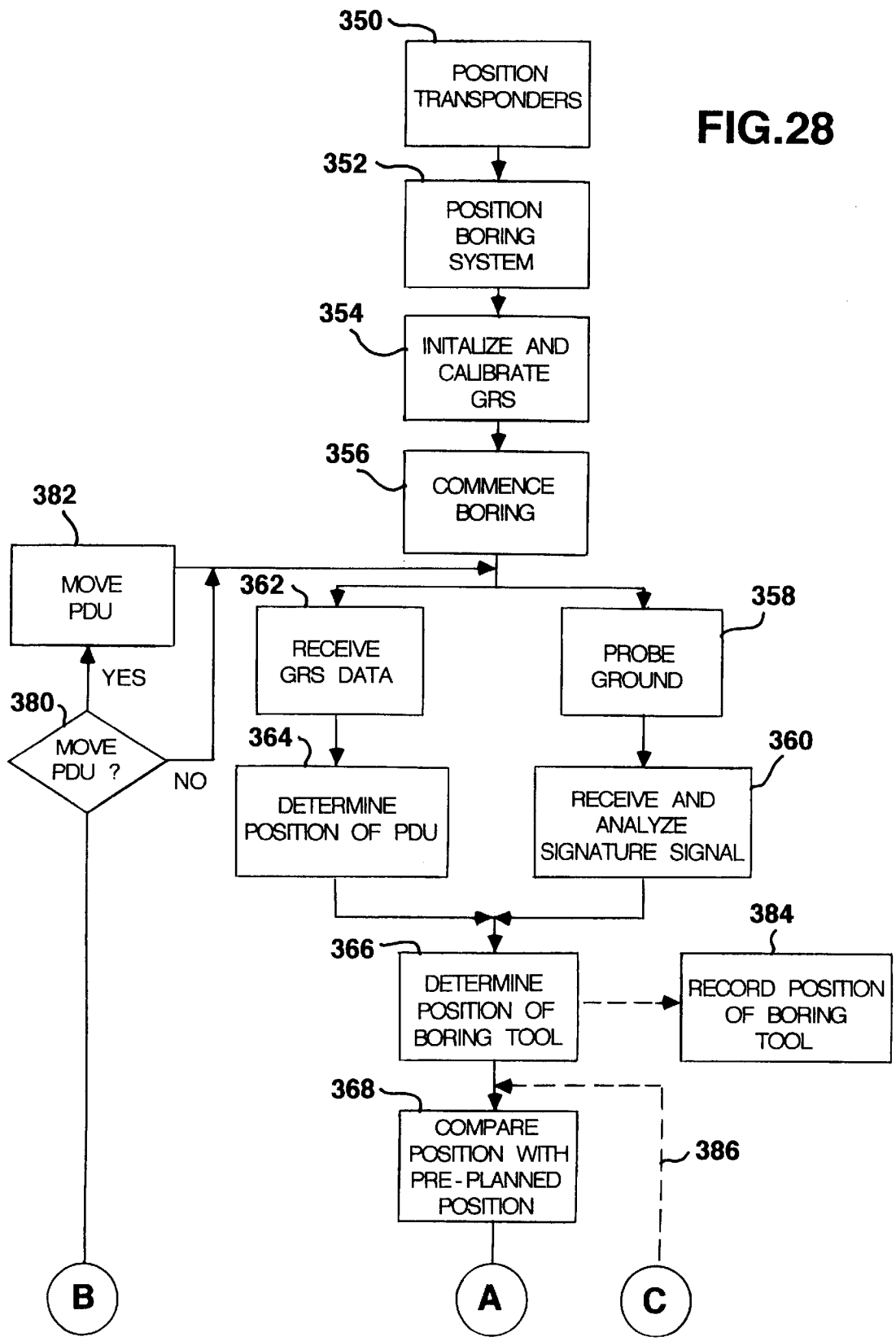
FIGS. 28–29 illustrate in flow diagram form generalized method steps for performing a trenchless boring operation.
Figure 29:
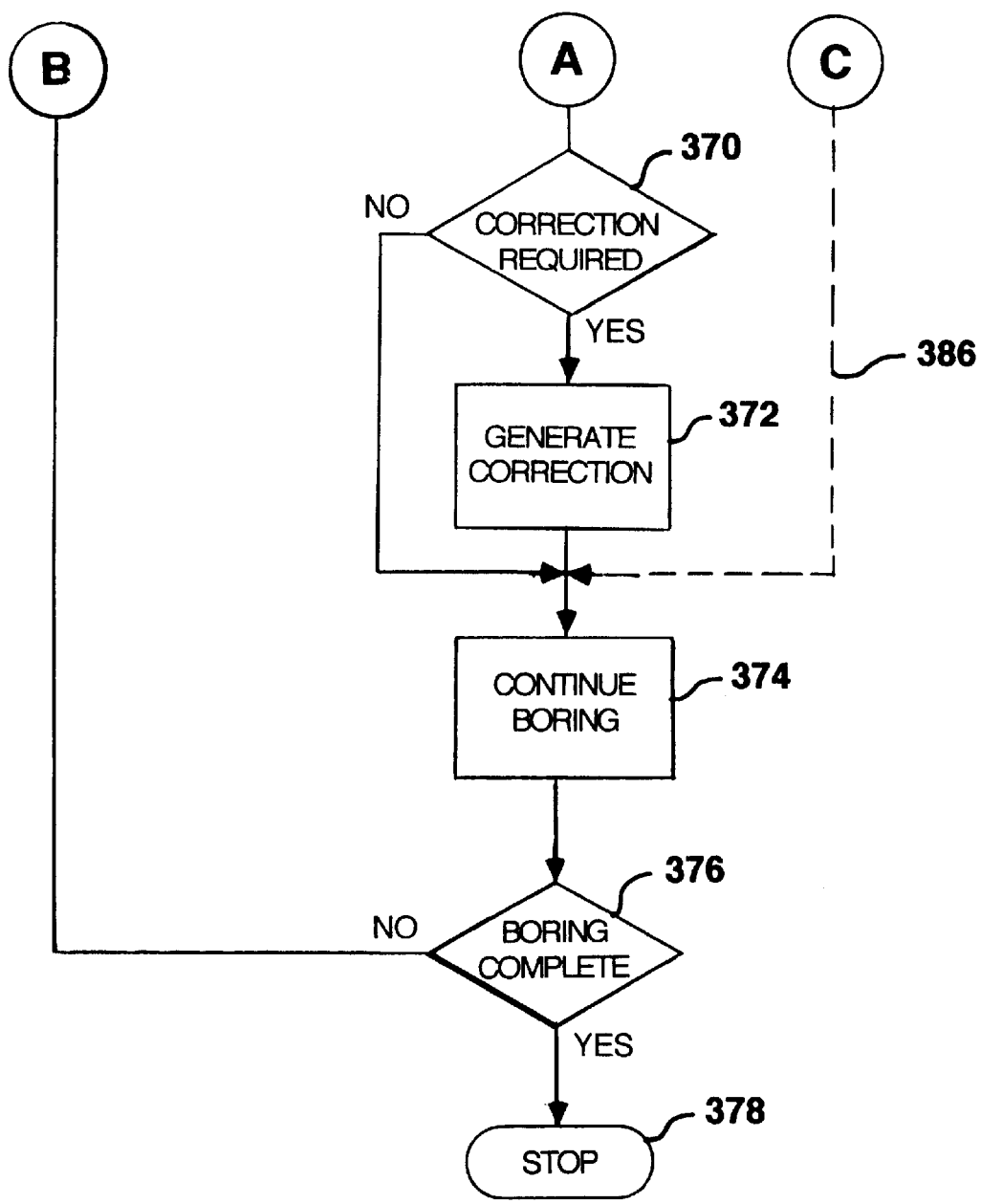

In FIGS. 28 and 29, there are illustrated flow charts for generalized process and decision steps associated with boring a trenchless hole through the ground. Initially, as shown in FIG. 28 and at step 350, a number of ground-based transponders are positioned at appropriate locations around a boring site. The trenchless underground boring system 12 is then positioned at the appropriate initial location, as indicated at step 352, and the transponders and geographic recording system are initialized and calibrated, at step 354, prior to the commencement of boring, at step 356. After boring has started, the PDU 28 probes the ground at step 358 and then receives and analyzes the signature signal at step 360. Independent of, and occurring concurrently with, the probing and receiving steps 358 and 360, the GRS receives position data at step 362 and determines the position of the PDU 28 at step 364. After steps 362 and 364 have been completed, the central processor 152 then determines the position of the boring tool 24 at step 366.

The central processor 152 then compares the measured position of the boring tool 24 with the expected position, at step 368, as given in the planned path database 156 and calculates whether or not a correction is required to the boring tool direction, at step 370, and provides a correction at step 372, if necessary. The trenchless underground boring system 12 continues to bore through the ground at step 374 until the boring operation is completed as indicated at steps 376 and 378. If, however, the boring operation is not complete, the central processor 152 decides, at step 380, whether or not the PDU 28 should be moved in order to improve the image of the boring tool 24. The PDU 28 is then moved if necessary at step 382 and the probing and GRS data reception steps 358 and 362 recommence. The operation is halted after the boring tool 24 has reached a final destination.

In an alternative embodiment, shown in dashed lines in FIGS. 28 and 29, the central processor 152 records, at step 384, the calculated position of the boring tool 24 in the route mapping database 158 and/or the route recording database 154, after determining the position of the boring tool at step 366. In another embodiment, the steps of comparing (step 368) the position of the boring tool 24 with a pre-planned position and generating any necessary corrections (steps 370 and 372) are omitted as is illustrated by the dashed line 386.

It will, of course, be understood that various modifications and additions can be made to the preferred embodiments discussed hereinabove without departing from the scope or spirit of the present invention. Accordingly, the scope of the present invention should not be limited by the particular embodiments described above, but should be defined only by the claims set forth below and equivalents thereof.

What is claimed is:

1. An apparatus for controlling an underground boring tool, comprising:
    a boring tool coupled to a drill pipe;
    a driving apparatus coupled to the drill pipe for driving the boring tool along an underground path;
    a detector interface that receives telemetry data from at least one of a plurality of antennae substantially in real-time, the telemetry data representative of a location of the boring tool along the underground path; and
    a control system comprising a controller communicatively coupled to the driving apparatus and the detector interface, the controller receiving the telemetry data from the detector interface and computing the location of the boring tool substantially in real-time, the controller transmitting control signals to the driving apparatus substantially in real-time to control one or both of a rate and a direction of boring tool movement along the underground path relative to the computed boring tool location.

2. The apparatus of claim 1, wherein the driving apparatus comprises:
    a rotation unit coupled to a rotation unit control that moderates rotation unit performance; and
    a displacement unit coupled to a displacement unit control that moderates displacement unit performance, the drill pipe coupled to the rotation unit for rotating the boring tool and coupled to the displacement unit for displacing the boring tool along the underground path;
    wherein the controller transmits control signals to each of the rotation and displacement unit controls substantially in real-time to control one or both of the rate and the direction of boring tool movement along the underground path relative to the computed boring tool location.

3. The apparatus of claim 1, wherein the controller computes the location of the boring tool in at least two of x-, y-, and z-plane coordinates using the telemetry data received by the detector interface.

4. The apparatus of claim 1, wherein the controller computes an orientation of the boring tool in at least two of yaw, pitch, and roll using the telemetry data received by the detector interface.

5. The apparatus of claim 1, wherein the telemetry data further comprises data representative of an orientation or a depth of the boring tool.

6. The apparatus of claim 1, wherein the detector interface receives the telemetry data as an electromagnetic signal or an acoustic signal.

7. The apparatus of claim 1, further comprising a beacon provided at the boring tool, the detector interface receiving telemetry data representative of the boring tool location derived from use of the beacon.

8. The apparatus of claim 1, further comprising a beacon provided at the boring tool and a detector that detects a signal emitted by the beacon, the detector interface receiving telemetry data representative of the boring tool location from the detector.

9. The apparatus of claim 1, further comprising a signal generator provided at the boring tool and a detector that receives a boring tool signal from the signal generator, the detector interface receiving telemetry data representative of the boring tool location from the detector.

10. The apparatus of claim 1, further comprising:
    a probe signal generator, separate from the boring tool, that generates a probe signal;
    a signal generator provided at the boring tool that produces a signature signal in response to the probe signal, the signature signal having a characteristic that differs from the probe signal in one of timing, frequency content, information content, or polarization; and
    a detector that produces the telemetry data representative of the boring tool location, the detector interface receiving the telemetry data from the detector.

11. The apparatus of claim 1, further comprising a ground penetrating radar (GPR) unit, the detector interface receiving the telemetry data from the GPR unit.

12. The apparatus of claim 1, wherein the plurality of antennae comprises an array of antennae.

13. The apparatus of claim 1, wherein the plurality of antennae comprises a plurality of spaced-apart antenna cells situated along the underground path.

14. The apparatus of claim 1, further comprising one or more geophysical sensors for sensing one or more geophysical characteristics of earth along the underground path, wherein the controller modifies one or both of the rate and the direction of boring tool movement along the underground path in response to signals received from the geophysical sensors.

15. The apparatus of claim 1, further comprising a display coupled to the controller for displaying a graphical representation of one or more of the boring tool location, orientation, the underground path, a buried object or boring tool movement along the underground path.

16. The apparatus of claim 1, further comprising a pre-established bore plan representative of a desired underground path accessible by the controller, wherein:

the controller compares the computed location of the boring tool with a desired boring tool location along the desired underground path and, in response to a difference between the computed and desired boring tool locations, transmits control signals to the driving apparatus substantially in real-time to control one or both of the rate and the direction of boring tool movement to urge the boring tool from the computed boring tool location to the desired boring tool location.

17. A method of controlling an underground boring tool, comprising:

rotating the boring tool;

displacing the boring tool;

detecting, by at least one of a plurality of antennae substantially in real-time, the boring tool while rotating and/or displacing the boring tool;

computing, substantially in real-time, a location of the boring tool in response to detection of the boring tool; and controlling, substantially in real-time, one or both of a rate and a direction of boring tool movement along the underground path relative to the computed boring tool location.

18. The method of claim 17, wherein detecting the boring tool further comprises detecting an electromagnetic signal or an acoustic signal emitted by the boring tool.

19. The method of claim 17, wherein detecting the boring tool further comprises detecting a beacon signal from the boring tool, and computing the location of the boring tool further comprises computing the location of the boring tool using the detected beacon signal.

20. The method of claim 17, further comprising:

receiving a probe signal at the boring tool;

producing a signature signal at the boring tool in response to the probe signal, the signature signal differing from the probe signal in one of timing, frequency content, information content, or polarization; and detecting the boring tool using the signature signal.

21. The method of claim 17, wherein detecting the boring tool further comprises detecting, by at least one of he plurality of antennae, a signal emitted by the boring tool.

22. The method of claim 17, wherein computing the location of the boring tool further comprises computing the boring tool location in at least two of x-, y-, and z-plane coordinates.

23. The method of claim 17, further comprising computing an orientation or a depth of the boring tool substantially in real-time.

24. The method of claim 17, further comprising computing an orientation of the boring tool in at least two of yaw, pitch, and roll.

25. The method of claim 17, wherein controlling boring tool movement further comprises modifying one or both of the rate and the direction of boring tool movement along the underground path in response to geophysical information acquired for the underground path.

26. The method of claim 17, further comprising displaying a graphical representation of one or more of a boring tool location, orientation, the underground path, a buried object or boring tool movement along the underground path.

27. The method of claim 17, further comprising:

providing a pre-established bore plan representative of a desired underground path;

comparing the computed location of the boring tool with a desired boring tool location along the desired underground path; and in response to a difference between the computed and desired boring tool locations, controlling one or both of the rate and the direction of boring tool movement to urge the boring tool from the computed boring tool location to the desired boring tool location.

28. An apparatus for controlling an underground boring tool, comprising:

means for rotating the boring tool;

means for displacing the boring tool;

means for detecting, by at least one of a plurality of antennae substantially in real-time, the boring tool while rotating and/or displacing the boring tool;

means for computing, substantially in real-time, a location of the boring tool in response to detection of the boring tool; and means for controlling, substantially in real-time, one or both of a rate and a direction of boring tool movement along the underground path relative to the computed boring tool location.

29. The apparatus of claim 28, wherein the detecting means further comprises means for detecting an electromagnetic signal or an acoustic signal emitted by the boring tool.

30. The apparatus of claim 28, wherein the detecting means further comprises means for detecting a beacon signal from the boring tool, and the computing means further comprises means for computing the location of the boring tool using the detected beacon signal.

31. The apparatus of claim 28, further comprising:

means for receiving a probe signal at the boring tool;

means for producing a signature signal at the boring tool in response to the probe signal, the signature signal differing from the probe signal in one of timing, frequency content, information content, or polarization; and means for detecting the boring tool using the signature signal.

32. The apparatus of claim 28, wherein the detecting means further comprises means for detecting, by at least one of the plurality of antennae, a signal emitted by the boring tool.

33. The apparatus of claim 28, wherein the computing means further comprises means for computing the boring tool location in at least two of x-, y-, and z-plane coordinates.

34. The apparatus of claim 28, further comprising means for computing an orientation or a depth of the boring tool substantially in real-time.

35. The apparatus of claim 28, further comprising means for computing an orientation of the boring tool in at least two of yaw, pitch, and roll.

36. The apparatus of claim 28, wherein the controlling means further comprises modifying one or both of the rate and the direction of boring tool movement along the underground path in response to geophysical information acquired for the underground path.

37. The apparatus of claim 28, further comprising means for displaying a graphical representation of one or more of a boring tool location, orientation, the underground path, a buried object or boring tool movement along the underground path.

38. The apparatus of claim 28, further comprising:

means for providing a pre-established bore plan representative of a desired underground path;

means for comparing the computed location of the boring tool with a desired boring tool location along the desired underground path; and means for controlling one or both of the rate and the direction of boring tool movement to urge the boring tool from the computed boring tool location to the desired boring tool location in response to a difference between the computed and desired boring tool locations.

* * * * *